US011541307B2

(12) United States Patent
Onda et al.

(10) Patent No.: US 11,541,307 B2
(45) Date of Patent: Jan. 3, 2023

(54) COMPUTER SYSTEM, VIEWER TERMINAL, METHOD FOR CONTROLLING LIVE WATCHING, AND PROGRAM

(71) Applicant: BANDAI NAMCO Entertainment Inc., Tokyo (JP)

(72) Inventors: Akio Onda, Warabi (JP); Michiru Takahashi, Tokyo (JP); Katsunori Yamada, Funabashi (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 603 days.

(21) Appl. No.: 16/576,850

(22) Filed: Sep. 20, 2019

(65) Prior Publication Data

US 2020/0009458 A1 Jan. 9, 2020

Related U.S. Application Data

(63) Continuation of application No. PCT/JP2018/012513, filed on Mar. 27, 2018.

(30) Foreign Application Priority Data

Mar. 31, 2017 (JP) .............................. JP2017-071560

(51) Int. Cl.
*A63F 13/46* (2014.01)
*A63F 13/30* (2014.01)
(Continued)

(52) U.S. Cl.
CPC .............. *A63F 13/30* (2014.09); *A63F 13/40* (2014.09); *A63F 13/48* (2014.09); *A63F 13/497* (2014.09); *A63F 13/95* (2014.09)

(58) Field of Classification Search
CPC .......... A63F 13/86; A63F 13/25; A63F 13/45; A63F 13/46; A63F 13/50; A63F 13/70; A63F 2300/577
See application file for complete search history.

(56) References Cited

U.S. PATENT DOCUMENTS

2009/0253506 A1 10/2009 Ishii et al.
2017/0001112 A1* 1/2017 Gilmore .................. A63F 13/30

FOREIGN PATENT DOCUMENTS

JP 2001-321573 A 11/2001
JP 2009-247562 A 10/2009
(Continued)

OTHER PUBLICATIONS

"How to use PS4 & Function Introduction," World Web Archive National Diet Library Internet Material Collection, Jan. 29, 2016, search on Oct. 19, 2021, [https://web.archive.org/web/20160229064107/http://nyanto.net/2014/03/entry552.html].

(Continued)

*Primary Examiner* — Omkar A Deodhar
(74) *Attorney, Agent, or Firm* — Oliff PLC

(57) ABSTRACT

A server system to manage esports live distribution distributes, to a viewer terminal, data for displaying an image of gameplay by players on the viewer terminal, and situation data. The situation data describes various situations, such as a viewer's watching situation, a game progress status, a player's operation situation, a reward generation situation, a posting situation of comments such as cheers, and an evaluation situation of players by viewers. In the viewer terminal, various types of situation data are compared with predetermined screen configuration change conditions, and when some of the conditions is satisfied, the present configuration of a watching screen is changed to a screen configuration associated with the satisfied condition to provide information for the viewer in such a manner as to facilitate understanding of a situation on each occasion.

21 Claims, 30 Drawing Sheets

(51) Int. Cl.
 *A63F 13/40* (2014.01)
 *A63F 13/48* (2014.01)
 *A63F 13/497* (2014.01)
 *A63F 13/95* (2014.01)

(56) References Cited

FOREIGN PATENT DOCUMENTS

| | | |
|---|---|---|
| JP | 2014-155544 A | 8/2014 |
| JP | 2015-97803 A | 5/2015 |
| JP | 2015-173990 A | 10/2015 |

OTHER PUBLICATIONS

May 15, 2018 International Search Report issued in International Patent Application No. PCT/JP2018/012513.

* cited by examiner

COMPUTER SYSTEM, VIEWER TERMINAL, METHOD FOR CONTROLLING LIVE WATCHING, AND PROGRAM

CROSS REFERENCE TO RELATED APPLICATION

This application is a continuation of International Patent Application No. PCT/JP2018/012513, having an international filing date of Mar. 27, 2018, which designated the United States, the entirety of which is incorporated herein by reference. Japanese Patent Application No. 2017-071560 filed on Mar. 31, 2017 is also incorporated herein by reference in its entirety.

BACKGROUND

Watching an image of gameplay by highly skilled players has been recognized as an entertainment equivalent to sports watching. Recently, this has been called "esports," and gameplay images have been distributed to viewers widely collected. Techniques for distributing gameplay video have been known since before, and one of the techniques is disclosed in Japanese Unexamined Patent Application Publication No. 2009-247562.

According to such a known technique regarding gameplay image distribution as in JP-A-2009-247562, for example, a portable terminal device is used to facilitate watching how other players play games without going to an actual gameplay site such as an arcade.

In the known technique, a watching screen of a gameplay image, that is, a screen watched by a viewer, includes the gameplay image as a main watching target, and an auxiliary information display section in some cases. On the known watching screen, the auxiliary information display section is fixedly disposed in a predetermined position relative to the gameplay image and has a predetermined size. In the auxiliary information display section, a user account and a handle of a player, a game title being played, a recording date, and other data are displayed. Display of the auxiliary information display section enables the viewer to know information regarding an origin of the gameplay image that the viewer is watching.

Distribution of the gameplay image is largely divided into two modes: recorded video distribution of distributing a video file recorded and edited; and live distribution.

In the recorded video distribution, gameplay is already over. Consequently, in the auxiliary information display section, data including a game result and a situation at a turning point is recorded and displayed as information resultant from looking back at gameplay after a game end. This display in the auxiliary information display section half cools heat of the viewer watching the gameplay.

In the case of live distribution, however, a start of distribution is managed by a schedule that the viewer can never intervene with. Such a circumstance often occurs that the viewer needs to start watching partway through the distribution. Therefore, expecting how the gameplay proceeds while considering a status of the live game currently in progress, the viewer is to watch the game in suspense and with excitement. This is similar to, for example, watching sports on television live. In the live distribution, a main image is the gameplay image. There is still room for improvement in display (i.e., how to provide information) in the auxiliary information display section in the live distribution.

DESCRIPTION OF EXEMPLARY EMBODIMENTS

Figure 1:
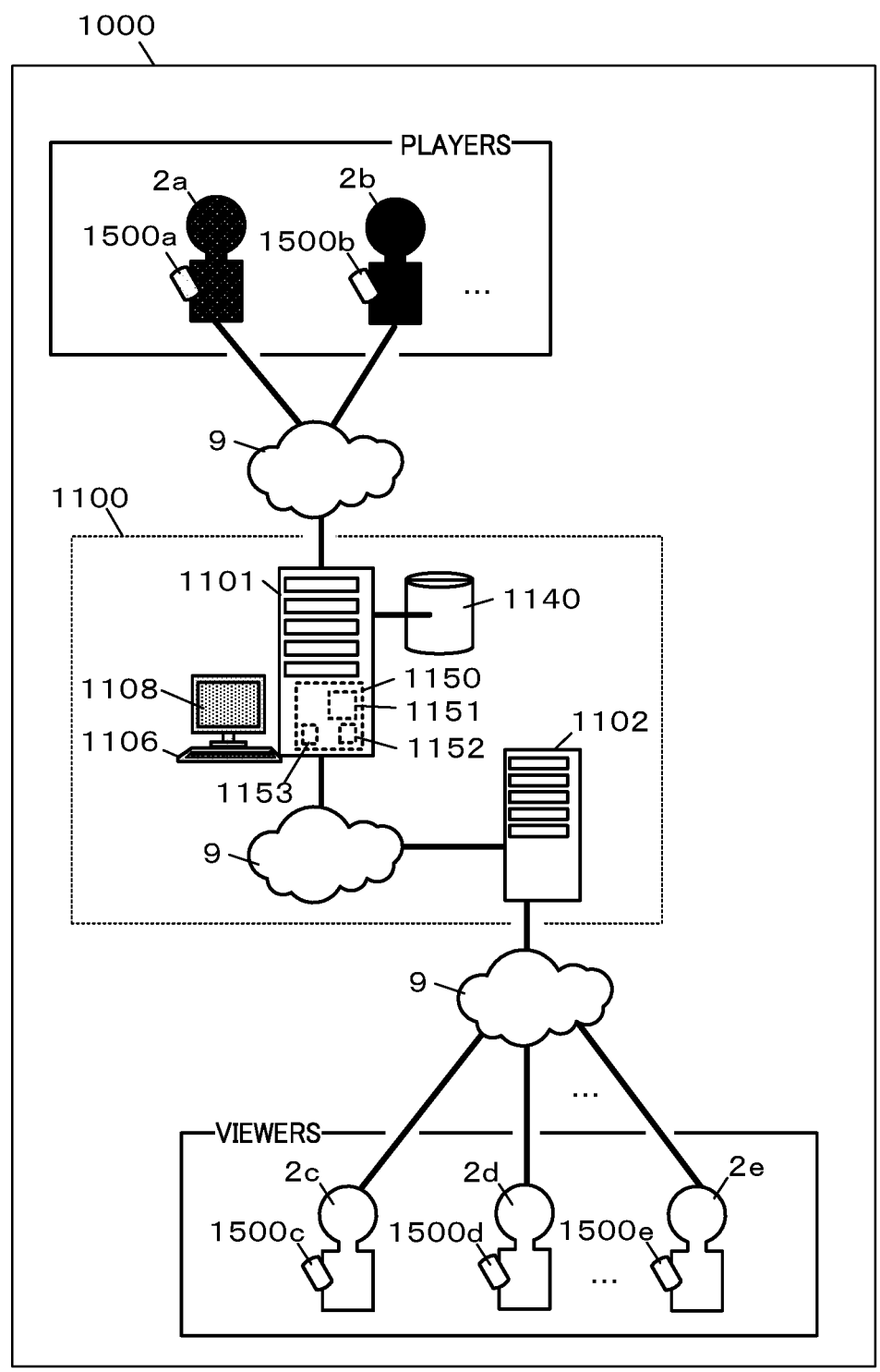
FIG. 1 is a diagram illustrating an example of a configuration of a game system also serving as an esports live distribution system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a computer system comprising:
a processor, and
a storage device storing a program,
the processor executing the program for
providing information of a watching screen for a viewer terminal with which a viewer user performs live watching of a game played by a player user; and
performing watching screen control of controlling the watching screen to change a screen configuration of the watching screen based on whether a screen configuration change condition for changing the screen configuration is satisfied during the live watching.

The "computer system" as used herein may be a system including a single computer or may be a system including a plurality of computers in communicable connection with each other.

As a result, in some embodiments, the screen configuration can be changed in accordance with a situation during the live watching to enhance interest in the live watching. For example, the screen configuration can be appropriately changed at a suitable timing to facilitate the viewer's understanding of a game status.

In accordance with one of some embodiments, there may be provided the computer system, wherein the watching screen control includes determining whether the screen configuration change condition based on a progress status of the game is satisfied.

As a result, in some embodiments, the screen configuration can be changed in accordance with a game progress status.

In accordance with one of some embodiments, there may be provided the computer system, wherein the watching screen control includes controlling the watching screen to make the screen configuration include a component to display descriptive information of the progress status of the game when the screen configuration change condition based on the progress status of the game is satisfied.

As a result, in some embodiments, information describing the game progress status that has caused the screen configuration to change can be displayed. This enables the viewer user to know what is happening in the game progress and informs the viewer user of highlights in the game progress. Components to display the descriptive information may be set as appropriate. Not only a text such as descriptive sentences but also symbols, background images, and other components may be employed to describe the game progress status.

In accordance with one of some embodiments, there may be provided the computer system, wherein the watching screen control includes determining whether the screen configuration change condition based on an operation situation of the player user is satisfied.

As a result, in some embodiments, the screen configuration can be changed in accordance with an operation situation of the player user.

In accordance with one of some embodiments, there may be provided the computer system, wherein the watching screen control includes controlling the watching screen to make the screen configuration include a component to display descriptive information of the operation situation of the player user when the screen configuration change condition based on the operation situation of the player user is satisfied.

As a result, in some embodiments, information describing the operation situation of the player user that has caused the screen configuration to change can be displayed. This enables the viewer user to know, for example, a present operation tendency of the player user appropriately at a suitable timing. Components to display the descriptive information may be set as appropriate. Not only a text such as descriptive sentences but also symbols, background images, and other components may be employed to describe the operation situation of the player user.

In accordance with one of some embodiments, there may be provided the computer system, wherein the watching screen control includes determining whether the screen configuration change condition based on a watching situation of the viewer user is satisfied.

As a result, in some embodiments, the screen configuration can be changed in accordance with a watching situation of the viewer user.

In accordance with one of some embodiments, there may be provided the computer system, wherein the watching screen control includes relationship-based watching screen control of controlling the watching screen to change the screen configuration based on whether a predetermined relationship is set between the player user and the viewer user.

The "predetermined relationship" as used herein may include the following examples: the case of what is called "friend" registration in which users register each other as a friend; the case in which an intimacy parameter value set between users in the friend registration has reached a threshold indicating a predetermined favorable state; the case in which users are registered as members of the same team; the case in which users are using the same kind of characters as the player characters; and the case in which users have histories of playing together in the past. Note that the predetermined relationship can be set as appropriate in accordance with the game content.

As a result, in some embodiments, the screen configuration can be changed based on whether the predetermined relationship is set between the player user and the viewer user. For example, in the case of acquaintances, the screen configuration can be colored to resemble a color scheme of the character of the player user, and the screen configuration can have an image of the character of the player user as a background image. Thus, the screen configuration can be changed to improve the viewer user's sense of unity with the player user, which may lead to cheering the player user as a supporter.

In accordance with one of some embodiments, there may be provided the computer system,
the processor executing the program for further accepting evaluation of the player user's gameplay by the viewer user,
wherein the watching screen control may include determining whether the screen configuration change condition based on the accepted evaluation is satisfied.

As a result, in some embodiments, evaluation of the player user's gameplay by the viewer user can be accepted, and the screen configuration can be changed based on the evaluation.

In accordance with one of some embodiments, there may be provided the computer system, wherein the watching screen control includes controlling the watching screen to make the screen configuration include a component to display the accepted evaluation when the screen configuration change condition based on the evaluation is satisfied.

With this configuration, the viewer user can be informed of the accepted evaluation. Since the viewer can know other viewer users' evaluation to enhance interest in the live watching.

In accordance with one of some embodiments, there may be provided the computer system, wherein the accepting the evaluation includes starting the accepting the evaluation when a number of the viewer users satisfies a predetermined threshold condition.

As a result, in some embodiments, when the number of the viewer users exceeds a predetermined number, accepting the evaluation can be started.

In accordance with one of some embodiments, there may be provided the computer system,
the processor executing the program for further giving a given reward to the viewer user and/or the player user when a predetermined reward giving condition is satisfied,
wherein the watching screen control includes determining whether the screen configuration change condition determined based on whether the reward has been given is satisfied.

As a result, in some embodiments, a system for giving the reward to the viewer user and the player user can be provided, and the screen configuration can be changed in response to giving the reward. For example, display elements to notify giving the reward and describe how to use the reward may be added to the screen configuration.

In accordance with one of some embodiments, there may be provided the computer system, wherein the watching screen control includes controlling the watching screen to make the screen configuration include a component to display the reward when the screen configuration change condition determined based on whether the reward has been given is satisfied.

As a result, in some embodiments, information related to the reward can be provided for the viewer user.

In accordance with one of some embodiments, there may be provided the computer system, wherein the giving the reward includes determining whether the reward giving condition is satisfied based on any one of a number of the viewer users, a progress status of the game, and whether a predetermined relationship is set between the viewer user and the player user.

As a result, in some embodiments, the reward can be given based on the number of viewer users, the game progress status, and the relationship between the viewer user and the player user.

In accordance with one of some embodiments, there may be provided the computer system,
the processor executing the program for further accepting cheering of the player user by the viewer user,
wherein the watching screen control may include determining whether the screen configuration change condition based on the accepted cheering is satisfied.

As a result, in some embodiments, cheering of the player user by the viewer user can be accepted, and the screen configuration can be changed based on the cheering. For example, when the number of cheers exceeds a predetermined number and when the number of cheers including specified words (such as "Cheer up!") exceeds a predetermined number, the screen configuration can be changed.

In accordance with one of some embodiments, there may be provided the computer system, wherein the watching screen control includes controlling the watching screen to make the screen configuration include a component to display the accepted cheering when the screen configuration change condition based on the cheering is satisfied.

As a result, in some embodiments, details of the cheering performed by the viewer user can be seen to make the live watching more exciting and enhance attraction of the live watching.

In accordance with one of some embodiments, there may be provided the computer system, wherein the accepting the cheering includes starting the accepting the cheering when a number of the viewer users satisfies a predetermined threshold condition.

As a result, in some embodiments, when the number of viewer users exceeds a predetermined number, accepting the cheering can be started.

In accordance with one of some embodiments, there is provided a viewer terminal configured to:
receive, from a server system, information of a watching screen with which a viewer user performs live watching of a game played by a player user; and
perform watching screen control of controlling the watching screen to change a screen configuration of the watching screen based on whether a screen configuration change condition for changing the screen configuration is satisfied during the live watching.

In accordance with one of some embodiments, there is provided a game system comprising:
the viewer terminal as defined in claim 21; and
a server system.

In accordance with one of some embodiments, there is provided a method for controlling live watching, the method comprising:
with a viewer terminal,
receiving, from a server system, information of a watching screen with which a viewer user performs live watching of a game played by a player user; and
performing watching screen control of controlling the watching screen to change a screen configuration of the watching screen based on whether a screen configuration change condition for changing the screen configuration is satisfied during the live watching.

Exemplary embodiments are described below. Note that the following exemplary embodiments do not in any way limit the scope of the content defined by the claims laid out herein. Note also that all of the elements described in the present embodiment should not necessarily be taken as essential elements.

FIG. 1 is a diagram illustrating an example of a configuration of a game system according to the present embodiment. A game system 1000 according to the present embodiment is a system also serving as an esports live distribution system capable of distributing a gameplay image live, and includes a server system 1100 and a plurality of user terminals 1500 (1500*a*, 1500*b*, . . . ) that can be connected to a communication line 9 to communicate with each other to exchange data. That is, the game system 1000 is a content providing system to provide contents roughly divided into two kinds, namely, online games and esports watching.

The "esports" as used herein is an abbreviation of electronic sports. Of registered users related to a game title, one or a plurality of users 2 (2*a*, 2*b*, . . . in the example illustrated in FIG. 1) are set as "players" (occasionally referred to also as participants or clans) whereas one or a plurality of users 2 (2*c*, 2*d*, 2*e*, . . . in the example illustrated in FIG. 1) are set as "viewers". The "esports live distribution" as used herein is to distribute live how the players play a game to each of the user terminals 1500 of the viewers, namely, a viewer terminal.

Thus, the game system 1000 according to the present embodiment also functions as an esports live distribution system to collect and generate information required for the esports live distribution and to manage distributing the information.

The communication line 9 is a communication channel that enables data communications. Specifically, the communication line 9 includes a communication network such as a local area network (LAN) using a private line (private cable) for direct connection, Ethernet (registered trademark), or the like, a telecommunication network, a cable network, or the Internet. The communication method may be a cable communication method or a wireless communication method.

The server system 1100 is a core system for the esports live distribution and is a computer system including a game server 1101, a distribution server 1102, and a storage 1140. The game server 1101 functions as a game server to provide, as an online game, a game title to be distributed as esports. The distribution server 1102 collects, generates, and distributes information required for the esports live distribution and implements the distribution. The server system 1100 also includes a keyboard 1106 for an administrator and a touch panel 1108. That is, the server system 1100 is a computer system to provide information for displaying a watching screen including a game image on the viewer terminal and to control the watching screen to implement live watching of the game played by player users on a viewer terminal of a viewer user. Since the game system 1000 as a whole implements the esports live distribution and watching, the game system 1000 may be referred to as a computer system.

The game server 1101 includes a control board 1150. The control board 1150 contains a microprocessor of various types (e.g., a central processing unit (CPU) 1151, a graphics processing unit (GPU)), and a digital signal processor (DSP), an IC memory 1152 of various types (e.g., a video random access memory (VRAM), a random access memory (RAM), and a read only memory (ROM)), and a communication device 1153. The control board 1150 may partially or entirely be implemented with an application specific integrated circuit (ASIC), a field-programmable gate array (FPGA), and a system on a chip (SoC).

Through a calculation process performed by the control board 1150 based on a predetermined program and data, the game server 1101 implements 1) a user management function related to user registration and the like, 2) a game management function of providing data required to play the game with the user terminals 1500 (1500*a*, 1500*b*, . . . ) to manage execution control on the game played with the user terminals 1500 (1500*a*, 1500*b*, . . . ), and 3) an online shopping function of selling various items, usable in the game, to users online. Thus, the game according to the present embodiment is implemented as one type of client-server online games.

As functions related to live distribution of the gameplay image, the game server 1101 implements 4) a setting registration function of players and viewers, 5) a watching data preparation function of preparing watching data (or basic data required to generate the watching data) to implement the esports live distribution with the user terminals 1500 of the viewers, and 6) an accounting function of collecting watching cost and paying game cost (play prize). Functions implemented with the game server 1101 are not limited to these, and other types of functions may be added or any of these types of functions may be omitted as appropriate.

The distribution server 1102 includes a control board equivalent to the control board 1150 of the server system 1100. Through a calculation process performed based on a predetermined program and data, the distribution server 1102 implements a function of distributing watching data to the user terminals 1500 of the viewers and a function of collecting various requests from the user terminals 1500 and transmitting the requests to the game server 1101. Functions of the distribution server 1102 are not limited to these, and any of these types of functions may be omitted or other types of functions may be added as appropriate. For example, the distribution server 1102 may have an additional function of generating watching data based on the basic data provided by the game server 1101.

The server system 1100 may be implemented as a single server. Alternatively, a plurality of blade servers and other components, in charge of various functions, may be installed while being connected to each other via an internal bus to be capable of performing data communications with each other. Furthermore, a plurality of independent servers, disposed in locations distant from each other, may perform data communications with each other via the communication line 9 to function as the server system 1100 as a whole. In FIG. 1, the game server 1101 and the distribution server 1102 are illustrated as separate units. However, the game server 1101 and the distribution server 1102 may each include a blade server, and be disposed and managed as an integral device.

The user terminals 1500 (1500*a*, 1500*b*, . . . ) are computer systems individually usable by registered users as players and viewers to play and watch the game, and are electronic devices (electronic apparatuses) that can access the server system 1100 via the communication line 9 to implement an online game. The user terminals 1500 used by players are referred to as player terminals, and the user terminals 1500 used by viewers are referred to as viewer terminals.

Each of the user terminals 1500 according to the present embodiment is a device known as a smartphone. The user terminal 1500 may also be a portable game device, a game controller, a personal computer, a tablet computer, a wearable computer, an arcade game apparatus, or the like.

Figure 2:
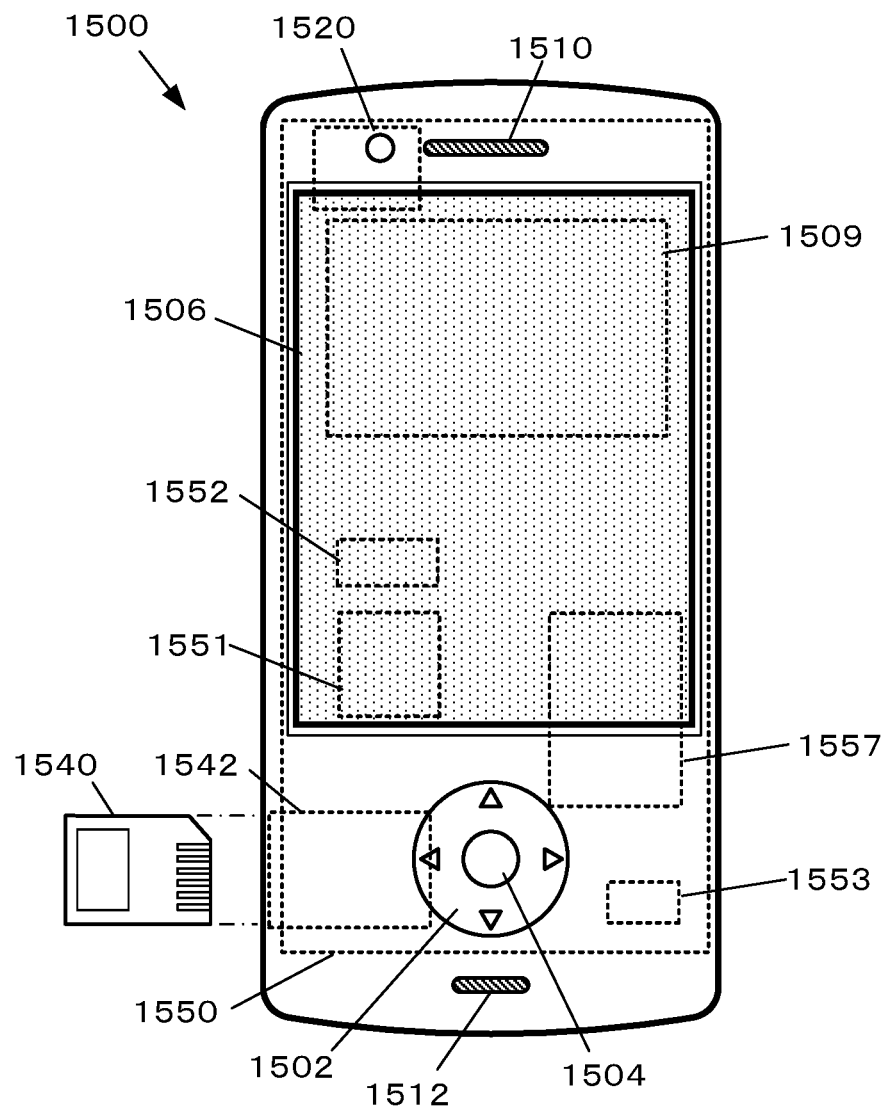
FIG. 2 is a front view of a user terminal, illustrating an example of a configuration thereof.

FIG. 2 is a front view of the user terminal 1500 according to the present embodiment, illustrating an example of a configuration thereof.

The user terminal 1500 includes an arrow key 1502, a button switch 1504, a touch panel 1506 that functions as an image display device and a touch position input device, a speaker 1510, a built-in battery 1509, a microphone 1512, an image sensor unit 1520, a control board 1550, and a memory card reader 1542 that can write and read data on and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data on and from an IC card, such as a credit card or a prepaid card, usable for payment involved in playing the game.

The control board 1550 contains a microprocessor of various types (e.g., a CPU 1551, a GPU, and a DSP), an IC memory 1552 of various types (a VRAM, a RAM, and a ROM), a wireless communication module 1553 for performing wireless communications with a mobile phone base station, a wireless LAN base station, or the like connected to the communication line 9, an interface circuit 1557, and the like.

The interface circuit 1557 includes, for example, a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, a circuit that inputs image data of an image captured by the image sensor unit 1520, and a signal input-output circuit that inputs and outputs a signal to and from the memory card reader 1542.

The elements mounted on the control board 1550 are electrically connected with each other via a bus circuit or the like to be capable of exchanging data and signals. The control board 1550 may partially or entirely be implemented with an ASIC, an FPGA, or a SoC. The control board 1550 stores, in the IC memory 1552, programs and various types of data for implementing a function as a gameplay terminal and a function as an esports live distribution terminal.

A client program and various types of setting data are downloaded by the user terminal 1500 from the server system 1100 in the present embodiment. The program and the data may also be read from a storage medium such as the memory card 1540 additionally provided.

[Content of Game and Watching Screen]

Figure 3:
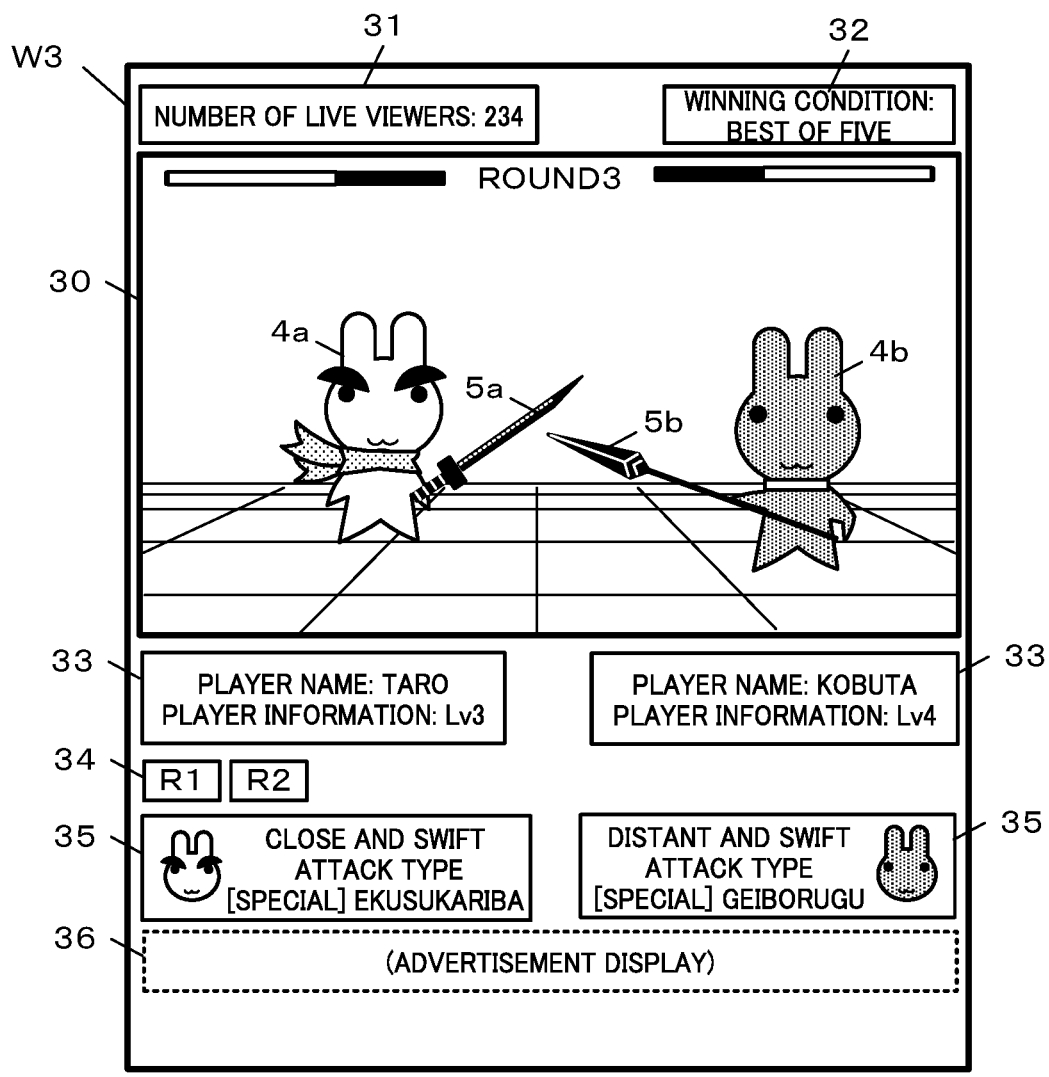
FIG. 3 is a diagram illustrating an example of a format of a watching screen including a gameplay image and illustrating an example of the watching screen of a standard screen configuration.

FIG. 3 is a diagram illustrating an example of a format of a watching screen including a gameplay image according to the present embodiment.

During the esports live distribution, a watching screen W3 is displayed on the touch panel 1506 of the user terminal 1500 (viewer terminal) used by the viewer. The watching screen W3 includes a gameplay image display section 30 as a main display section, in which a gameplay image is displayed as a main target of the esports live distribution.

The game as a target of the esports live distribution in the present embodiment is a one-on-one fighting competition game. Specifically, the game is a competition game in which users as players compete against each other by manipulating player characters 4 (4a, 4b, ...) possessed by the users, and equipping the player characters 4 with items 5 (5a, 5b, ...) possessed by the users and using the items 5 during play. A player that scores three rounds out of five first is to become a winner. In the game system 1000 according to the present embodiment, a game that is not a target of the esports live distribution but is personally playable by registered users has the same game content.

The game may be of any genre and in any play mode.

For example, the game may be in a multiplayer, many-to-many survival mode and a team competition mode. The content of the competition may be not only fighting but also real-time strategy, shooting, racing, sports, go, shogi, chess, Othello, puzzle game, music game, and the like. In accordance with such a game genre and game content, the number and designs of player characters used by the players may be set as appropriate. For example, the number of the player characters 4 used by each player is not limited to one. A deck format including a plurality of characters may be adopted. Alternatively, a troop-against-troop format in which a plurality of characters constitute each troop may be adopted. Designs of the player characters 4 may be set as appropriate and include, for example, soldiers, racing cars, fighter planes, combat tanks, battleships, submarines, spaceships, and robots.

A method of displaying a gameplay image in the gameplay image display section 30 can be selected as appropriate. For example, the game server 1101 may dispose an object of each player character 4 in a game space, which is a three-dimensional virtual space, and control operating the object, and the game server 1101 may also generate an image in the three-dimensional virtual space in real time by capturing the image from a predetermined distribution point-of-view so as to provide the image for streaming distribution. Alternatively, operation input information of the players may be distributed to the viewer's user terminal 1500 (viewer terminal) to cause the viewer terminal to generate a gameplay image based on the distributed operation input information. In the present embodiment, the former of the two methods, namely, streaming distribution will be described.

The watching screen according to the present embodiment has a plurality of forms different in screen configuration. The example of the watching screen W3 illustrated in FIG. 3 has a standard screen configuration according to the present embodiment.

The "screen configuration" in this description refers to a layout of components of the screen, and each layout includes one or a plurality of components. Each of the components includes three elements, namely, a kind of displayed content, a display position in the screen, and a size of display. Consequently, when any one of the number of components displayed on the watching screen and the three elements of each component is different, the screen configuration is regarded as being different. That is, when the content, amount, and quality of information for the viewer to understand a situation are different, the screen configuration is regarded as being different.

However, when a component periodically or substantially periodically appears, moves, and disappears repeatedly to form a change pattern of the display mode (such as a flow display pattern of appearing from the right end of the screen, moving across the screen, and disappearing from the left end of the screen), the change pattern is regarded as a visual effect and considered not to affect the screen configuration.

The watching screen W3 of the standard screen configuration is the default watching screen according to the present embodiment and provides basic information even for a viewer not familiar with a game in live distribution to make the viewer understand a purpose of a competition and a progress status of the competition.

The information is provided by one or a plurality of components prepared for different details of the information.

The standard screen configuration includes the following components:

1) the gameplay image display section 30 to display a gameplay image;
2) a total viewers display section 31 to display the total number of viewers;
3) a winning condition display section 32 to display a winning condition and a play aim in a game title to be watched;
4) a player information display section 33 prepared for each player to display information regarding the corresponding player;
5) a competition progress display section 34 prepared for each player to concisely display information regarding situations, such as a competition progress or a placement of the corresponding player, in the game;
6) a character information display section 35 prepared for each player to display information of the player character 4 (4a, 4b, . . . ) used by the corresponding player; and
7) an advertisement display section 36.

The competition progress display section 34 according to the present embodiment is appended to the player information display section 33 of the player that has won in each round. Therefore, the competition progress display section 34 can be regarded as one of the components to display descriptive information as to a progress status at the time when a screen configuration change condition based on a progress status of the game is satisfied.

The gameplay image display section 30, the winning condition display section 32, and the competition progress display section 34 are essential display elements of the standard screen configuration. However, in accordance with the game content or other factors, the other display elements described above may be omitted as appropriate. Depending on the game content, a display section (component) of other information (e.g., comparison with a record time in a racing game) may be added as appropriate.

The content displayed by each component and the layout including a disposition size and a disposed position relationship of each component on the screen in the standard screen configuration are not limited to the illustrated example but can be set as appropriate.

Figure 4:
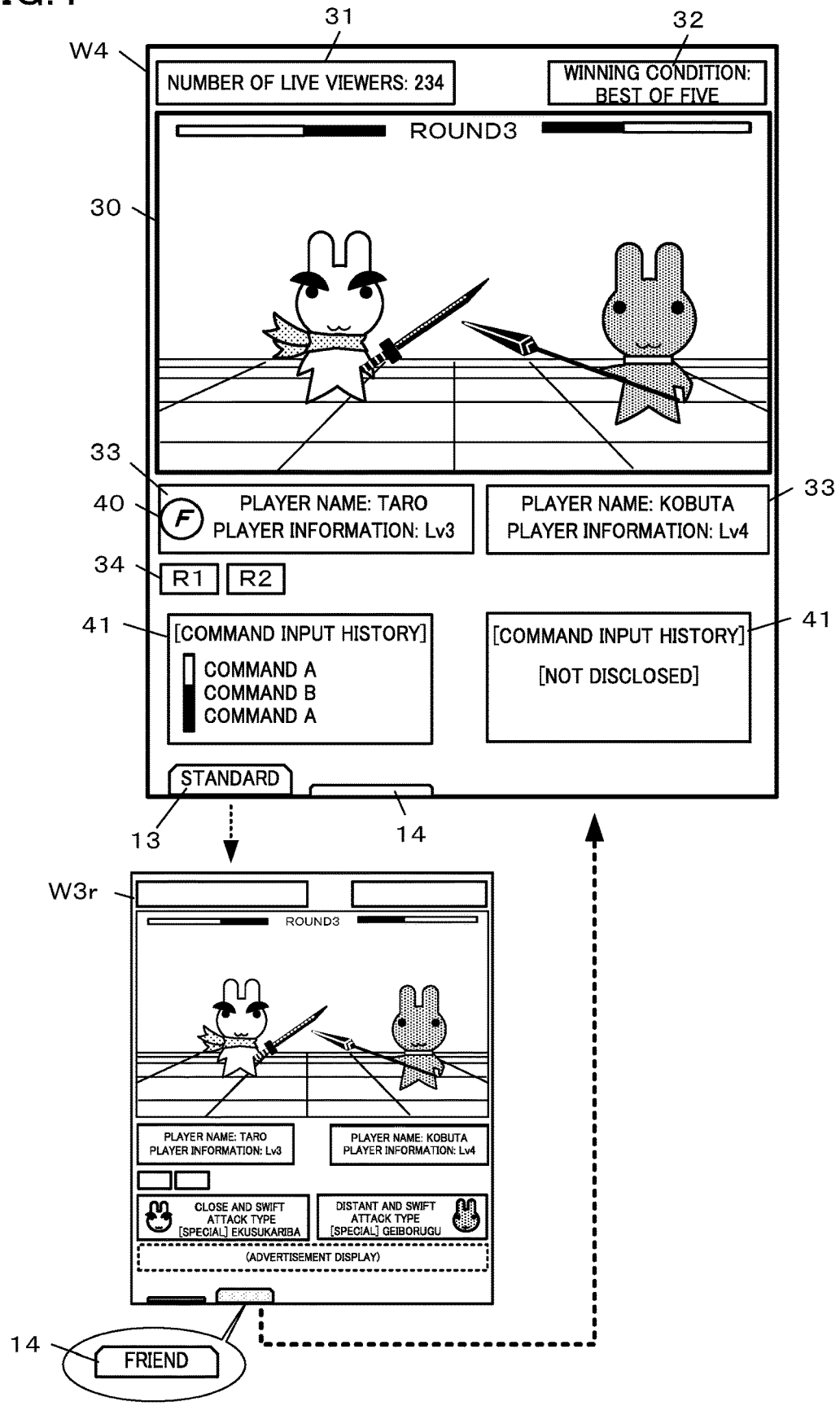
FIG. 4 is a diagram illustrating an example of the watching screen of a secondary standard screen configuration.

FIG. 4 is a diagram illustrating an example of a format of a watching screen according to the present embodiment. This example of the watching screen has a secondary standard screen configuration. The secondary standard screen configuration is a screen configuration set as the default in place of the standard screen configuration when a predetermined relationship is set between a player and a viewer. In other words, the secondary standard screen configuration is a screen configuration applied based on whether a predetermined relationship is set between a player user and a viewer user, and is a screen configuration of the watching screen selected in place of the standard screen configuration based on a viewer situation and viewer information.

The "predetermined relationship" as used herein can be set as appropriate in accordance with the game content. For example, as the predetermined relationship, the following may be adopted: 1) the case of what is called "friend" registration in which users register each other as a friend; 2) the case in which an intimacy parameter value set between users in the friend registration has reached a threshold indicating a predetermined favorable state; 3) the case in which users are registered as members of the same team; 4) the case in which users are using the same kind of characters as the player characters 4 (4a, 4b, . . . ); and 5) the case in which users have histories of playing together in the past.

When players have private information partly disclosable, examples of the predetermined relationship may also include the case in which the player and the viewer are from the same hometown or graduated from the same alma mater. In the present embodiment, the friend registration is adopted.

Specifically, some of the display elements of the standard screen configuration are omitted from a watching screen W4 of the secondary standard screen configuration.

Instead, display sections to display information limited to viewers having the predetermined relationship are added. In the example illustrated in FIG. 4, as compared with FIG. 3, the character information display sections 35 and the advertisement display section 36 are omitted. Instead, a relationship display section 40, input history display sections 41, a standard screen configuration calling icon 13, and a secondary standard screen configuration calling icon 14 are additionally displayed.

Specifically, the layout of the gameplay image display section 30, the total viewers display section 31, the winning condition display section 32, the player information display sections 33, and the competition progress display section 34 is the same as in the standard screen configuration. However, the other display elements are eliminated, and the relationship display section 40, the input history display sections 41, the standard screen configuration calling icon 13, and the secondary standard screen configuration calling icon 14 are additionally displayed.

The relationship display section 40 is a display member to concisely represent a relationship between the player and the viewer. In the present embodiment, the relationship display section 40 has a design to the effect that the player and the viewer register each other as a friend. In accordance with a definition of the adopted relationship, an image of a team emblem may be used for the design. The design may include a text of a team name and a win-loss record.

The input history display section 41 is prepared for each player and displays a history of operation input, namely, input of operation commands that has been performed by the corresponding player from a game start to the present time. The input history display section 41 displays kinds of controller keys and command names. The input history display section 41 is displayed only as to the player having the predetermined relationship with the viewer. In the example illustrated in FIG. 4, because the viewer has no relationship with the player on the right side in FIG. 4, the input history display section 41 has no disclosure.

The standard screen configuration calling icon 13 is an icon to input an operation to switch from the secondary standard screen configuration to the standard screen configuration. When this icon is operated, the watching screen can be returned to the watching screen W3 (see FIG. 3) of the standard screen configuration. In a watching screen W3r of the standard screen configuration called for by the standard screen configuration calling icon 13, the standard screen configuration calling icon 13 and the secondary standard screen configuration calling icon 14 to return to the watching screen W4 of the secondary standard screen configuration are displayed. However, the former is not to be touch-operated, and only the latter is displayed to be touch-operated. When the latter is touch-operated, the watching screen can be returned to the watching screen W4 of the secondary standard screen configuration.

In order to enlarge the size of the input history display section 41, display sizes and display positions, namely, the layout of the gameplay image display section 30, the total viewers display section 31, the winning condition display section 32, the player information display sections 33, and the competition progress display section 34 may be changed to examples other than the illustrated example.

The watching screen according to the present embodiment has the standard screen configuration and the secondary standard screen configuration as basic screen configurations. However, in accordance with a change in various situations, such as a viewer situation, a game status, or a player situation, the screen configuration is automatically changed to add or replace various screen components (information display sections) so as to facilitate the viewer's acquisition of information regarding the live distribution.

A parameter regarding the "viewer situation" may be set as appropriate in accordance with the game content. In the present embodiment, the total number of viewers is employed. Other statistic values such as an average value or a median value of continuous watching time from a watching start may be employed.

Figure 5:
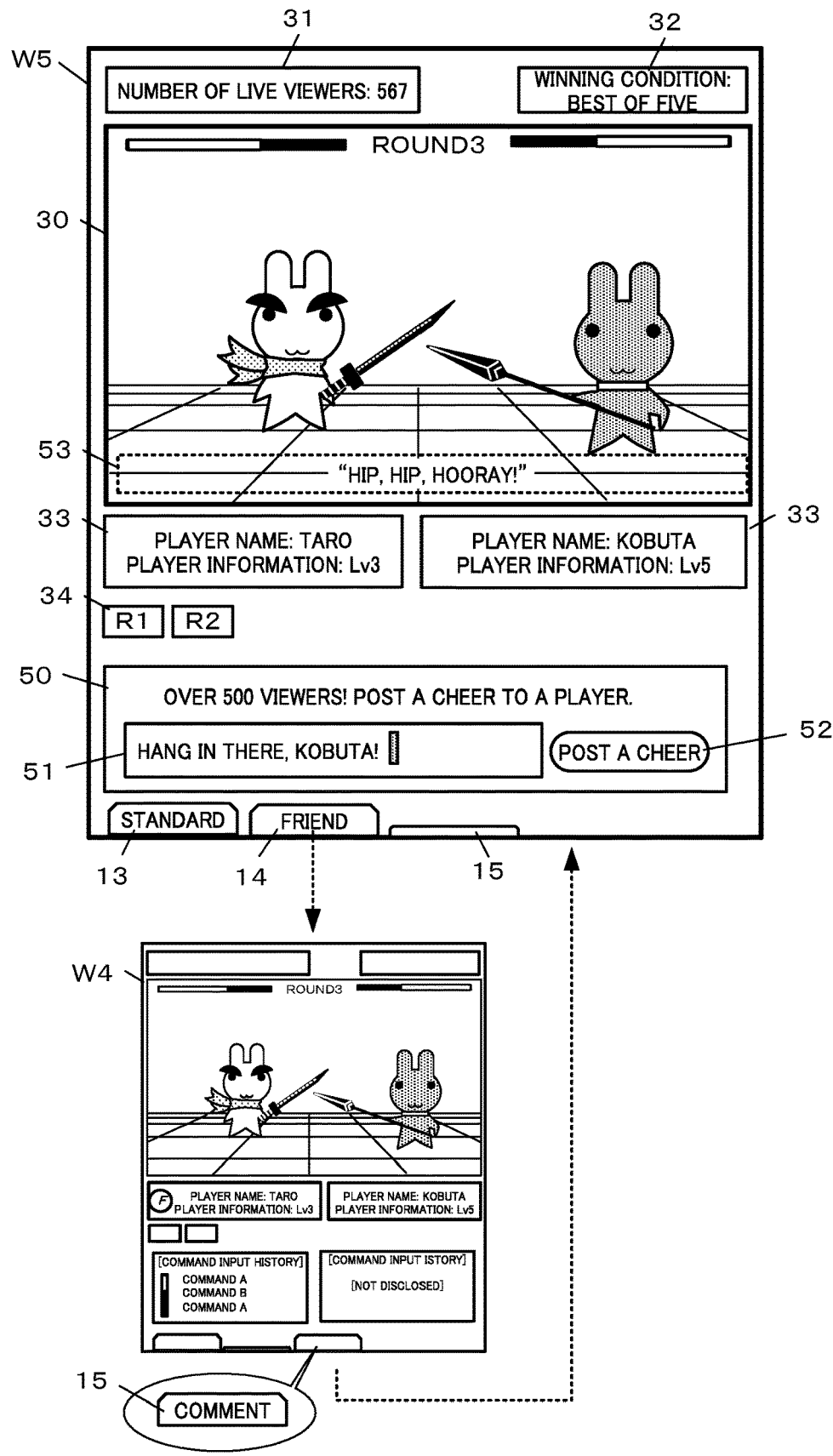
FIG. 5 is a diagram illustrating an example of the watching screen of a comment posting screen configuration.

FIG. 5 is a diagram illustrating an example of a change of a screen configuration in accordance with a viewer situational change. FIG. 5 illustrates an example of the watching screen of a comment posting screen configuration.

In the present embodiment, when the total number of viewers reaches a predetermined threshold, the viewer is allowed to post a comment. This may also be referred to as a comment posting function being freed. A watching screen W5 of the comment posting screen configuration is a screen to announce and enable comment acceptance, from which some of the components (display sections) that have been displayed are omitted. Instead, a comment posting display section 50 to accept a comment posted by the viewer, a comment display section 53, and a comment posting screen configuration calling icon 15 are additionally displayed.

The example illustrated in FIG. 5 is assumed to have changed from the watching screen W4 in FIG. 4, and the layout of the gameplay image display section 30, the total viewers display section 31, the winning condition display section 32, the player information display sections 33, the competition progress display section 34, the standard screen configuration calling icon 13, and the secondary standard screen configuration calling icon 14 is the same as in the standard screen configuration. However, the other display elements are eliminated, and the comment posting display section 50, the comment display section 53, and the comment posting screen configuration calling icon 15 are additionally displayed.

The comment posting display section 50 includes, for example, display of the number of viewers ("Over 500 viewers!" in FIG. 5), which is a requirement for displaying this display section. The comment posting display section 50 further includes a comment input section 51 to input a text of a comment such as a cheer, and a posting confirmation operation icon 52 to input an operation to confirm posting of the input text.

Thus, the comment posting screen configuration can be regarded as a screen configuration including a component to display the number of viewer users, which is displayed when a screen configuration change condition based on a watching situation of viewer users is satisfied.

A method of displaying the posted comment may be set as appropriate. According to the present embodiment, in the watching screen W5 of the comment posting screen configuration, the comment display section 53 is disposed as the component to display the comment such as a cheer in the gameplay image display section 30, and the text of the comment is displayed in the form of a flow from one end to the other end of the gameplay image display section 30. Alternatively, a pop-up having a relatively small markup-balloon shape may be temporarily displayed on the screen.

When the standard screen configuration calling icon 13 and the secondary standard screen configuration calling icon 14 are operated in the watching screen W5 of the comment posting screen configuration, the watching screen can be respectively returned to the watching screen W3r of the standard screen configuration and the watching screen W4 of the secondary standard screen configuration. Once the watching screen W5 of the comment posting screen configuration is displayed, the comment posting screen configuration calling icon 15 is also displayed in the watching screen thus returned. Then, when this icon is operated, the watching screen can be returned to the watching screen W5 of the comment posting screen configuration again.

Figure 6:
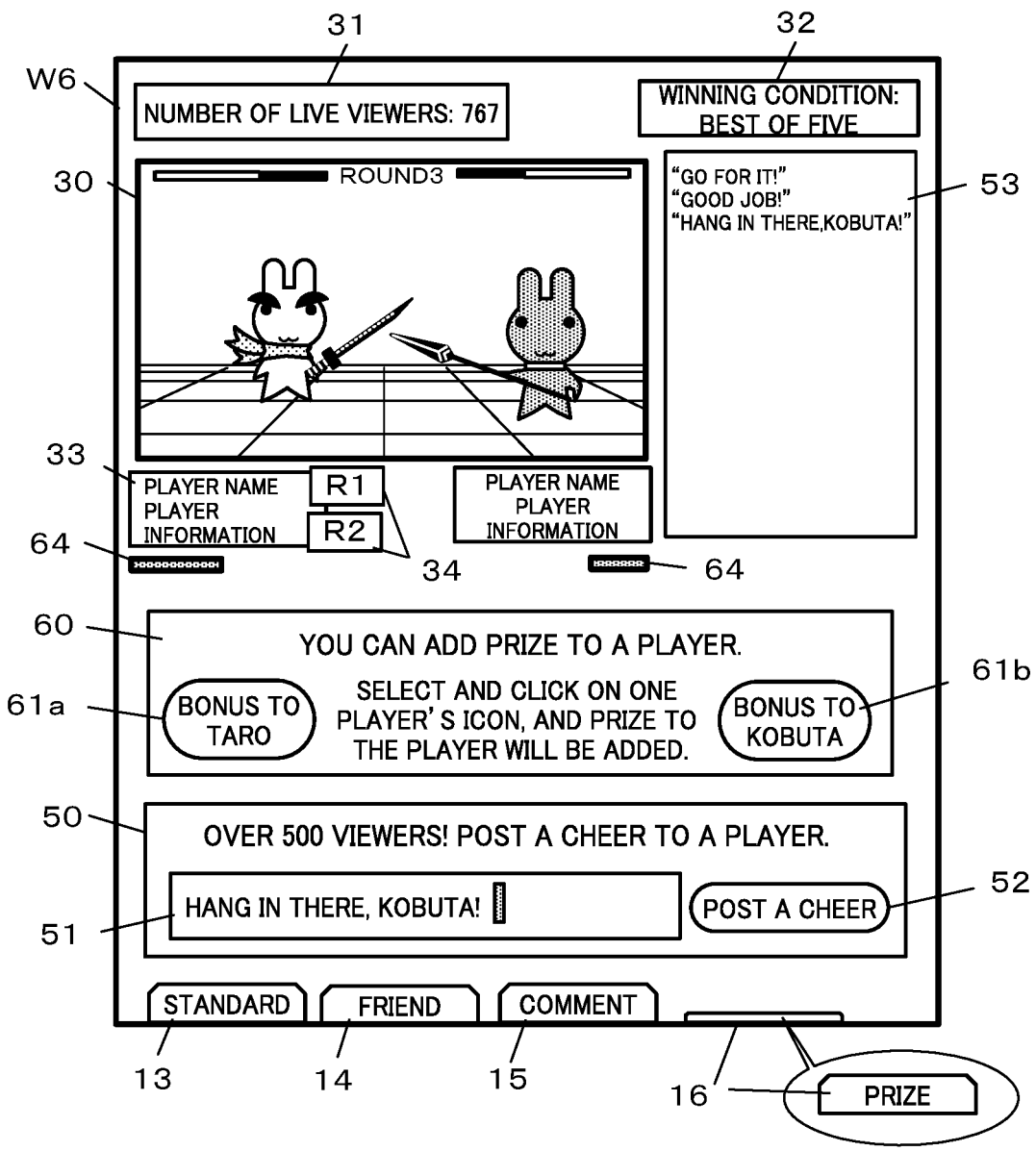
FIG. 6 is a diagram illustrating an example of the watching screen of a prize addition screen configuration.

FIG. 6 is a diagram illustrating another example of a change of a screen configuration in accordance with a viewer situational change. FIG. 6 illustrates an example of the watching screen of a prize addition screen configuration.

In the present embodiment, when a condition is satisfied, for example, when the total number of viewers reaches a second predetermined threshold or when an increase rate of the total number of viewers reaches a predetermined reference value, the comment posting function by viewers is freed, and a prize addition function to enhance prize to players in accordance with viewer operations is freed. A watching screen W6 of the prize addition screen configuration is a screen to announce that the functions have been freed and to enable acceptance of a comment input operation and a prize addition operation. Some of the display elements that have been displayed are omitted. Instead, the comment posting display section 50 to accept a comment posted by a viewer, the comment display section 53, a prize addition-related display section 60, gained additional prize display sections 64, the comment posting screen configuration calling icon 15, and a prize addition screen configuration calling icon 16 are displayed.

Specifically, in the watching screen W6 of the prize addition screen configuration, the layout of the gameplay image display section 30, the total viewers display section 31, the winning condition display section 32, the player information display sections 33, and the competition progress display section 34 is changed to decrease in size and be concentrated to secure a space for the prize addition-related display section 60 and other elements.

The prize addition-related display section 60 includes a prize-added player selecting icon 61 (61a, 61b, . . . ) prepared for each player (or each team depending on the game content) to input a selection operation of a player to whom prize is added. Each time this icon is touch-operated, additional prize is given to the player associated with this selecting icon.

The gained additional prize display section 64 is prepared for each player and is a component to display evaluation of the corresponding player by the viewer. In the present embodiment, the gained additional prize display section 64 concisely indicates an amount of additional prize gained by the corresponding player. For example, such a bar-graph design as illustrated in FIG. 6 may be employed, and a specific amount of prize may be displayed in a numerical value. In other words, the gained additional prize display section 64 indirectly represents which player the viewer cheers or evaluates.

The prize addition screen configuration calling icon 16 is also displayed on the watching screen that has been called for by operating the standard screen configuration calling icon 13, the secondary standard screen configuration calling icon 14, and the comment posting screen configuration calling icon 15. When the prize addition screen configuration calling icon 16 is operated, the screen configuration can be returned to the watching screen W6 of the prize addition screen configuration.

The watching screen W6 of the prize addition screen configuration is not limited to the illustrated example configuration but may be changed as appropriate. For example, considering a screen space, display of the comment posting display section 50 may be omitted. When there is a sufficient screen space, the layout of the gameplay image display section 30, the total viewers display section 31, the winning condition display section 32, the player information display sections 33, and the competition progress display section 34 may be the same as the layout of the standard screen configuration.

Figure 7:
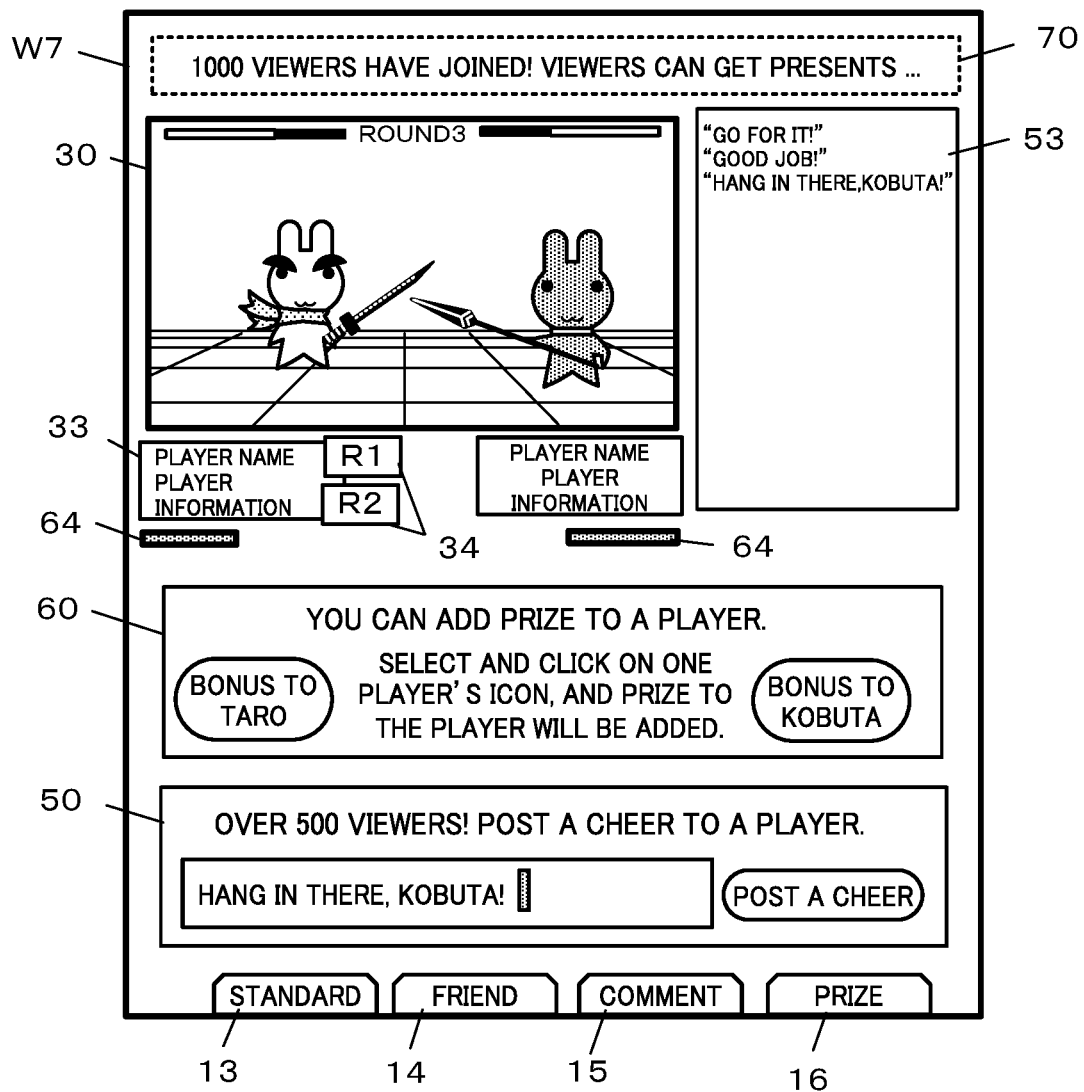
FIG. 7 is a diagram illustrating an example of the watching screen of a reward generation notifying screen configuration.

FIG. 7 is a diagram illustrating still another example of a change of a screen configuration in accordance with a viewer situational change. FIG. 7 illustrates an example of the watching screen of a reward generation notifying screen configuration.

In the present embodiment, when a condition is satisfied, for example, when the total number of viewers reaches a predetermined threshold, a reward is given to viewers. A watching screen W7 of the reward generation notifying screen configuration is a screen to announce that a reward to viewers has been generated. Some of the display elements that have been displayed are omitted. Instead, a reward generation notifying display section 70 is displayed.

In the illustrated example, display of the total viewers display section 31 and the winning condition display section 32 is omitted from the watching screen W6 (see FIG. 6) of the prize addition screen configuration, and the reward generation notifying display section 70 is displayed. Note that even in a state of a watching screen of other screen configurations being displayed, the reward generation notifying display section 70 is similarly displayed when a condition is satisfied, for example, when the total number of viewers reaches a predetermined threshold.

The reward generation notifying display section 70 is a display section to indicate a reward. Specifically, a text to the effect that a reward has been generated, why the reward is to be given, and what the content of the reward is, is displayed in a flow.

"Those who will be given a reward (reward gainers)" may be all of the viewers or may be a predetermined number of viewers selected at random by lottery. The reward gainers may be limited to viewers that register the player as a friend. Note that a reward may be given to the players. For example, when the number of viewers is a gigantic value (e.g., 10000), the reward may not be given to the viewers, but the reward gainers may be limited to the players. When the number of viewers is a more gigantic value, the reward may be given to both of the viewers and the players.

The "details of reward" may be set as appropriate. As the reward, items usable in the game to be watched, virtual currency points, coupons, vitality points consumed in accordance with time and content of gameplay by users, and the like may be set. The same reward may be given to all of the reward gainers or the reward may be shared based on information regarding viewers.

The "information regarding viewers" may include, for example, friend registration with the player, a level/rank of the viewer as a player, a play frequency of a game title to be watched, and presence of a game title to be watched in a wish list of a game manufacturer (e.g., subscribing to a game title in a video distribution site where the game manufacturer provides contents). The friend registration according to the present embodiment is set in such a manner that a viewer with the friend registration can gain a more valuable reward than a viewer without the friend registration.

In the present embodiment, the watching screen W7 of the reward generation notifying screen configuration is maintained for a preset maintaining period. When the maintaining period elapses after switching to the watching screen W7, the screen configuration of the watching screen is automatically returned to the previous screen configuration.

Figure 8:
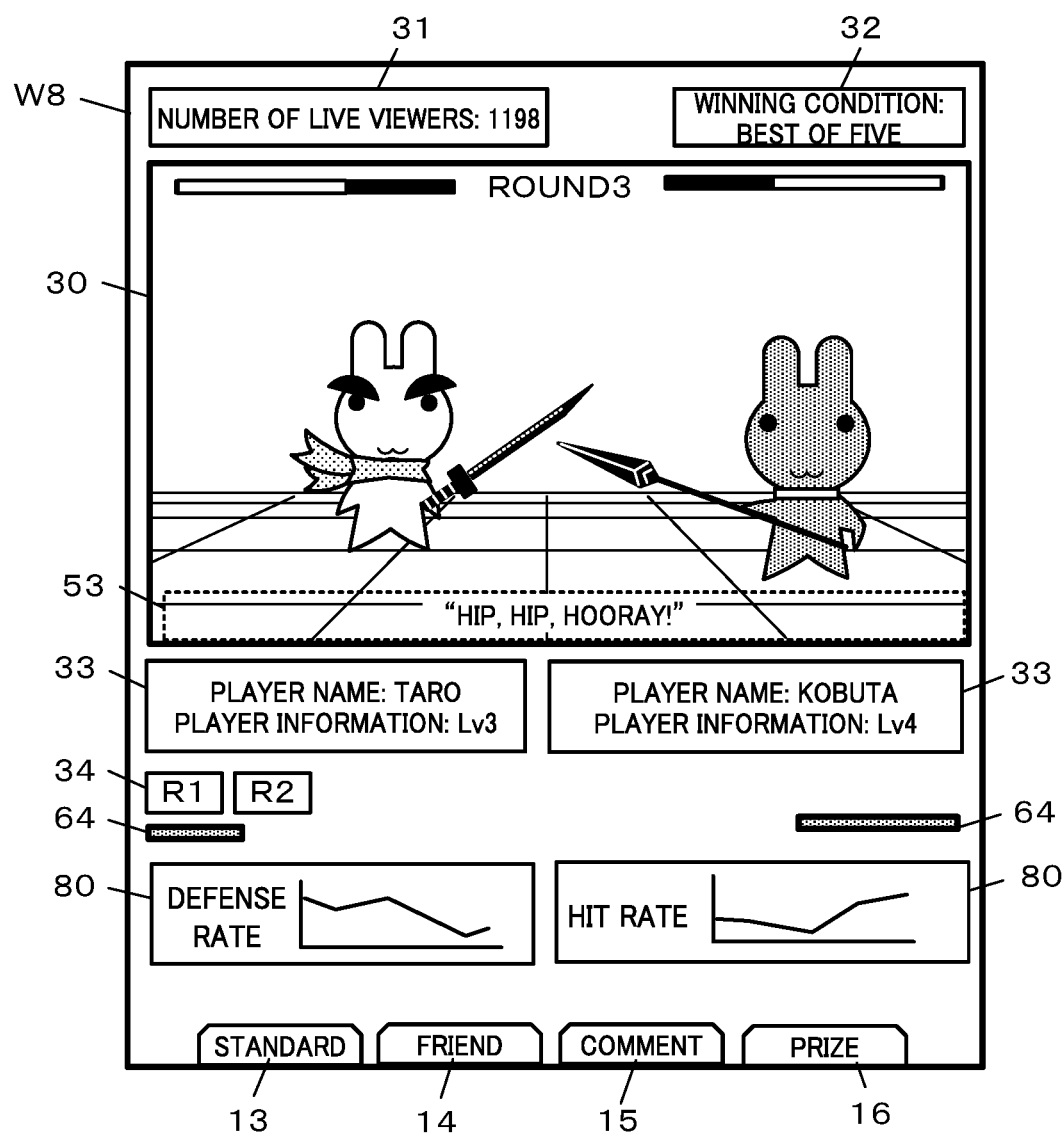
FIG. 8 is a diagram illustrating an example of the watching screen of a progress status change screen configuration.

FIG. 8 is a diagram illustrating another example of a change of a screen configuration in accordance with a status change in the game progress. FIG. 8 illustrates an example of the watching screen of a progress status change screen configuration. In the present embodiment, when a given notable change regarding the game progress (game progress status change) is detected, the watching screen is changed to a watching screen W8 of the progress status change screen configuration to announce to the viewer that the progress status has changed or is changing.

The "given notable change regarding the game progress (game progress status change)" as used herein is defined by various parameter values indicating a game progress status in AND or OR relationship.

In a competition game such as a fighting game, setting examples of the given notable change regarding the game progress may include when a change exceeding a reference has occurred in an attack hit rate and a defense rate, when consecutive attacks, namely, "combos," the consecutive number of which exceeds a reference, have occurred, and when a special bold move has hit. In a racing game, setting examples may include going off course, malfunction in a racing car, a great change in lap time, and a great weather change. In a real-time strategy simulation game, setting examples may include extinction of a troop and occupation of a spot among predetermined key points. Of any game genre, setting examples may include a player's down, use of specified items, and great damage exceeding a reference value.

When the given notable change regarding the game progress is detected, the watching screen is changed to the watching screen W8 of the progress status change screen configuration, and some of the display sections that have been displayed are deleted. Instead, descriptive information display sections 80 are displayed. In other words, the descriptive information display sections 80 may be regarded as a component to display descriptive information of a game progress status when a screen configuration change condition based on a game progress status is satisfied.

In the illustrated example, the descriptive information display sections 80 display data of individual players indicating that a hit rate of attacks by one of the players has suddenly increased, and that damage to the other player has started to sharply increase. Note that the content of the descriptive information display section 80 is not limited to this but graphs, icons, texts, and numerical values, for example, may be fully utilized as appropriate to facilitate understanding of the notable change.

In the present embodiment, the watching screen W8 of the progress status change screen configuration is maintained for a preset maintaining period. When the maintaining period elapses after switching to the watching screen W8, the screen configuration of the watching screen is automatically returned to the previous screen configuration.

Figure 9:
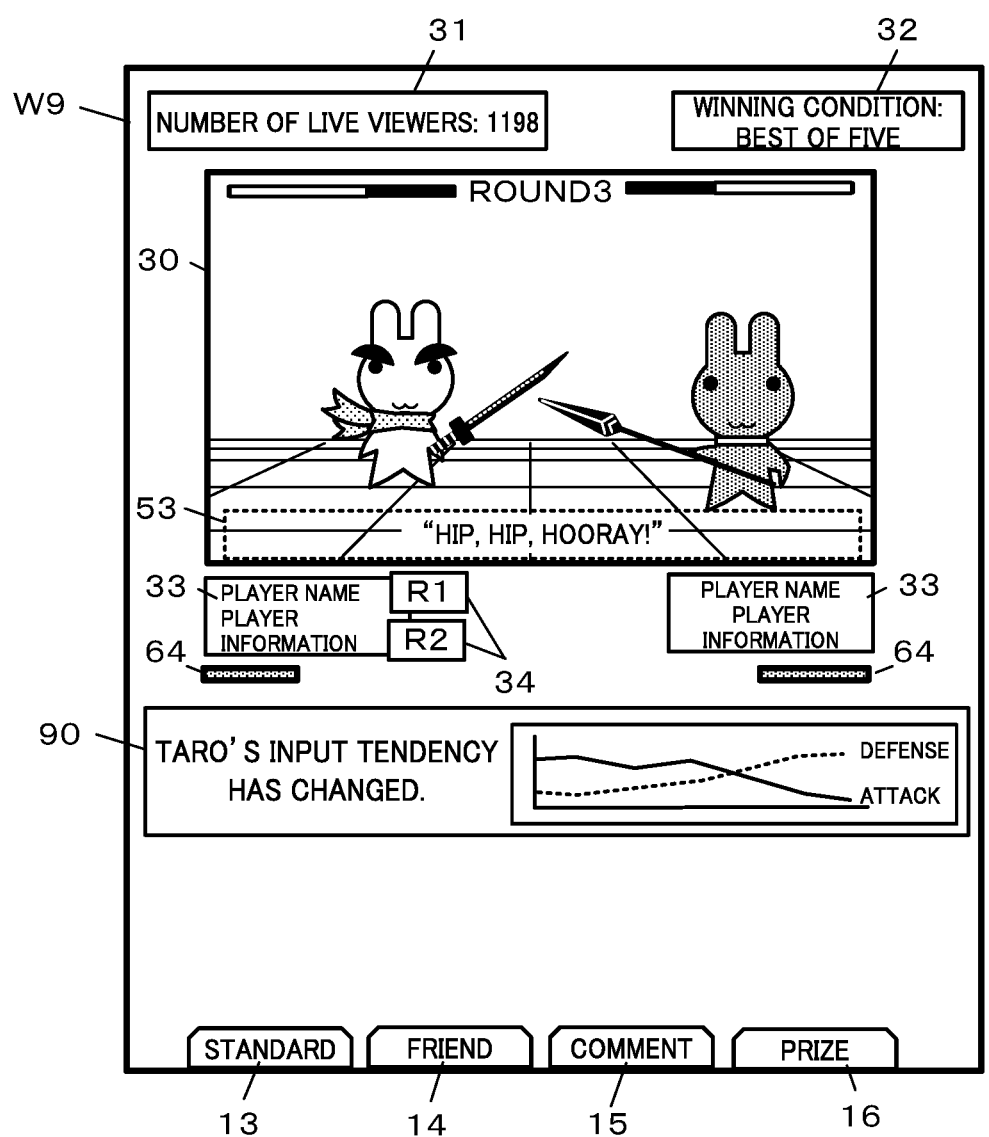
FIG. 9 is a diagram illustrating an example of the watching screen of a player situational change screen configuration.

FIG. 9 is a diagram illustrating another example of a change of a screen configuration in accordance with a situational change of a player. FIG. 9 illustrates an example of the watching screen of a player situational change screen configuration. In the present embodiment, when a given notable change regarding a player (player situational change) is detected, the watching screen is changed to a watching screen W9 of the player situational change screen configuration to announce to the viewer that the situation regarding the player has changed or is changing.

The "given notable change regarding the player (player situational change)" as used herein is defined by various parameter values regarding the player in AND or OR relationship. Setting examples of the given notable change regarding the player may include a distribution change of kinds of operation input and a change of an operation input amount per unit time.

When the watching screen is changed to the watching screen W9 of the player situational change screen configuration, some of the display sections that have been displayed are deleted. Instead, a player change display section 90 is displayed. In other words, the player change display section 90 may be regarded as a component to display descriptive information of an operation situation of a player user when a screen configuration change condition based on an operation situation of a player user is satisfied.

The illustrated example includes display of the player change display section 90 announcing that distribution of kinds of operation input by a player has changed, and the comment display section 53.

The number of player change display sections 90 is not limited to one but a plurality of player change display sections 90 as to individual players (or individual teams) may be displayed at a time. The content of the player change display section 90 is not limited to this but graphs, icons, texts, and numerical values, for example, may be fully utilized as appropriate to facilitate understanding of the notable change.

In the present embodiment, the watching screen W9 of the player situational change screen configuration is maintained for a preset maintaining period. When the maintaining period elapses after switching to the watching screen W9, the screen configuration of the watching screen is automatically returned to the previous screen configuration.

[Functional Configuration]

Figure 10:
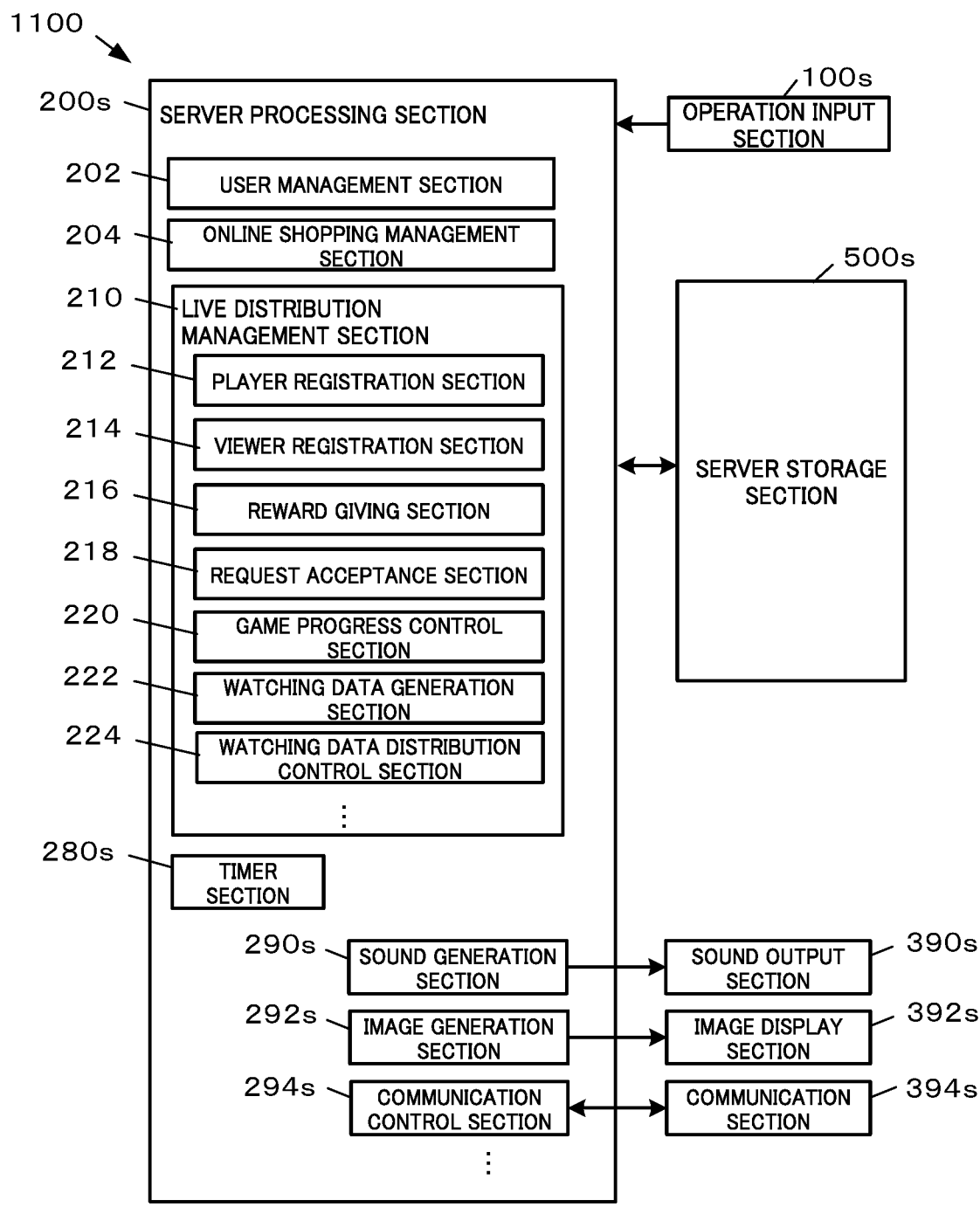
FIG. 10 is a functional block diagram illustrating an example of a functional configuration of a server system.

FIG. 10 is a functional block diagram illustrating an example of a functional configuration of the server system 1100 according to the present embodiment. The server system 1100 according to the present embodiment includes an operation input section 100s, a server processing section 200s, a sound output section 390s, an image display section 392s, a communication section 394s, and a server storage section 500s.

The operation input section 100s is for inputting various operations for server management. The operation input section 100s corresponds to the keyboard 1106 in FIG. 1.

The server processing section 200s is implemented with electronic parts, such as a microprocessor (e.g., a CPU and a GPU), an ASIC, or an IC memory. The server processing section 200s controls data exchanged between functional sections including the operation input section 100s and the server storage section 500s. The server processing section 200s corresponds to the control boards 1150 of the game server 1101 and the distribution server 1102 in the example illustrated in FIG. 1.

The server processing section 200s performs various calculation processes based on a predetermined program, data, the operation input signal from the operation input section 100s, and data received from the user terminal 1500 to entirely control the operation of the server system 1100.

The server processing section 200s according to the present embodiment includes a user management section 202, an online shopping management section 204, a live distribution management section 210, a timer section 280s, a sound generation section 290s, an image generation section 292s, and a communication control section 294s. Note that functional sections other than these may be included as appropriate.

The user management section 202 performs a process related to a user registration procedure and manages the data of each user associated with a user account. In the present embodiment, the user management section 202 has various functions including: 1) issuing a unique user account to a registered user; 2) registration information management for registering and managing personal information for each user account; 3) book keeping management for an electronic payment medium consumed for paying for a charged element (online shopping and play cost in the present embodiment); and 4) play history management for managing an inquiry request history. Note that any other appropriate management function for other data associated with the account can be included.

The online shopping management section 204 is in charge of control related to the online shopping, and can be implemented with a known online shopping technique as appropriate. In the present embodiment, the player can purchase, for example, items for use in the game to be watched through online shopping. Any other elements may be set as appropriate to be sold in the online shopping.

The live distribution management section 210 performs various controls related to live distribution of a gameplay image. Specifically, the live distribution management section 210 includes a player registration section 212, a viewer registration section 214, a reward giving section 216, a request acceptance section 218, a game progress control section 220, a watching data generation section 222, and a watching data distribution control section 224.

The player registration section 212 registers a player user. Specifically, when a predetermined player registration operation is input to the user terminal 1500, a user of this terminal is registered as a player.

The viewer registration section 214 registers a viewer user. Specifically, when a predetermined viewer registration operation is input to the user terminal 1500, a user of this terminal is registered as a viewer.

The reward giving section 216 gives a given reward to a viewer user and/or a player user when a predetermined reward giving condition is satisfied. Specifically, the reward is given by determining whether a reward giving condition is satisfied based on any one of the number of viewer users, a progress status of the game, and whether a predetermined relationship is set between the viewer user and the player user.

The request acceptance section 218 accepts various requests from a viewer terminal and implements the requests. In the present embodiment, the requests correspond to requests for posting of a comment such as a cheer and prize addition.

The game progress control section 220 controls the game progress.

The watching data generation section 222 generates distribution data, namely, watching data, for displaying the watching screen on the viewer terminal.

The watching data distribution control section 224 distributes and controls the generated watching data to the viewer terminal.

The timer section 280s uses a system clock to obtain the current date and time, a limited time period, and the like.

The sound generation section 290s is implemented with an integrated circuit (IC) or by executing software that generates sound data and performs decoding, and generates or decodes sound data on operation sound and background music (BGM) related to system management for the server system 1100 and the gameplay. The resultant sound signal related to the system management is output to the sound output section 390s.

The sound output section 390s receives the sound signal to emit the corresponding sound. The sound output section 390s corresponds to a speaker (not illustrated) of the game server 1101 or the touch panel 1108 in the example illustrated in FIG. 1.

The image generation section 292s can generate an image related to the system management for the server system 1100, a gameplay image (or data for displaying the gameplay image on the user terminal 1500), and the like. The image related to the system management can be output to the image display section 392s.

The image display section 392s displays various images for system management based on the image signals input from the image generation section 292s. The image display section 392s can be implemented with an image display device, such as a flat panel display, a cathode ray tube (CRT), a projector, or a head-mounted display. The image display section 392s corresponds to the touch panel 1108 in the example illustrated in FIG. 1.

The communication control section 294s performs a data process related to the data communication, and exchanges data with an external device through the communication section 394s.

The communication section 394s connects to the communication line 9 to implement communications. The communication section 394s is implemented with a transceiver, a modem, a terminal adapter (TA), a jack for a communication cable, a control circuit, and the like. The communication section 394s corresponds to the communication device 1153 in the example illustrated in FIG. 1.

The server storage section 500s stores a program and various types of data for implementing various functions of the server processing section 200s for entirely controlling the server system 1100. The server storage section 500s is used as a work area for the server processing section 200s, and temporarily stores the results of calculations performed by the server processing section 200s based on various programs. The functions of the server storage section 500s are implemented with an IC memory (e.g., RAM and ROM), a magnetic disk (e.g., hard disk), an optical disk (e.g., CD-ROM and DVD), an online storage, or the like. The server storage section 500s corresponds to a storage medium, such as the IC memory and hard disk of the control boards mounted in the game server 1101 and the distribution server 1102, and the storage 1140 in the example illustrated in FIG. 1.

Figure 11:
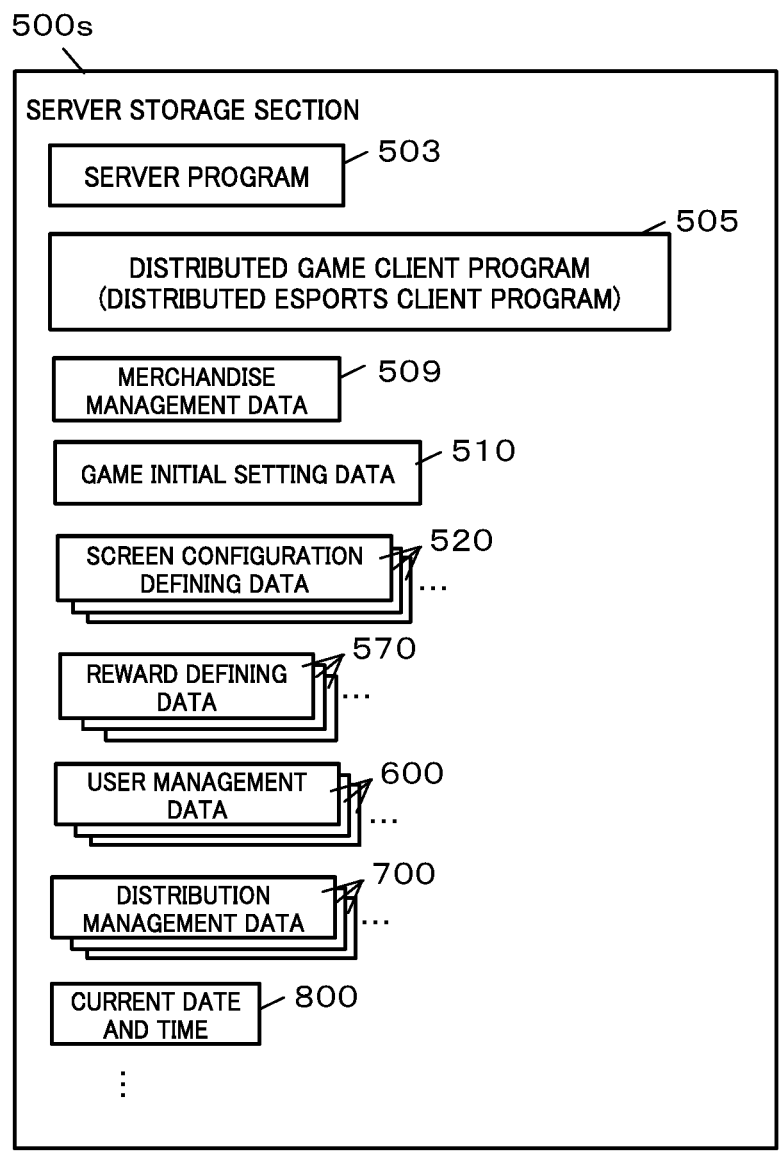
FIG. 11 is a diagram illustrating an example of programs and data stored in a server storage section.

FIG. 11 is a diagram illustrating an example of programs and data stored in the server storage section 500s according to the present embodiment. The server storage section 500s according to the present embodiment stores therein a server program 503, a distributed game client program 505, merchandise management data 509, game initial setting data 510, screen configuration defining data 520, and reward defining data 570.

The server storage section 500s stores data, sequentially generated and managed, including user management data 600, distribution management data 700, and the current date and time 800. Furthermore, the server storage section 500s can store information on a timer, a counter, various flags, and the like as appropriate.

The server program 503 is read out and executed by the server processing section 200s for implementing functions of the user management section 202, the online shopping management section 204, and the live distribution management section 210 (see FIG. 10).

The distributed game client program 505 is an original of a game client program provided for the user terminal 1500. In the present embodiment, a function of making the user terminal 1500 a viewer terminal is implemented as a function of the game client program 505. Thus, this program may be considered to include a "distributed esports client program." A portion corresponding to the distributed esports client program may be provided as a program different from the distributed game client program 505. The merchandise management data 509 includes data for defining and managing merchandise for online shopping. For example, purchasable items, stock quantities, and charge prices (equivalent to debit amounts from payment media in the present embodiment) are stored in association with one another. In the present embodiment, the merchandise includes the player characters 4 (4a, 4b, . . . ) and the items 5 (5a, 5b, . . . ) (see FIG. 3).

The game initial setting data 510 includes various kinds of initial setting data for executing an online game as a base of the esports live distribution. In the present embodiment, definition data of a virtual three-dimensional space as a stage of the game and initial setting data for displaying and operating character items appearing in the game. Note that data other than these can be included as appropriate.

The screen configuration defining data 520 includes various types of data for defining screen configuration patterns of the watching screen. As illustrated in FIGS. 12 to 18, for example, each of the screen configuration defining data 520 includes a unique screen configuration ID 521, screen configuration change condition data 530, screen maintaining time 540, screen configuration calling icon data 542, and individual component layout data 550 (550a, 550b, . . . ). Note that data other than these can be included as appropriate.

Figure 12:
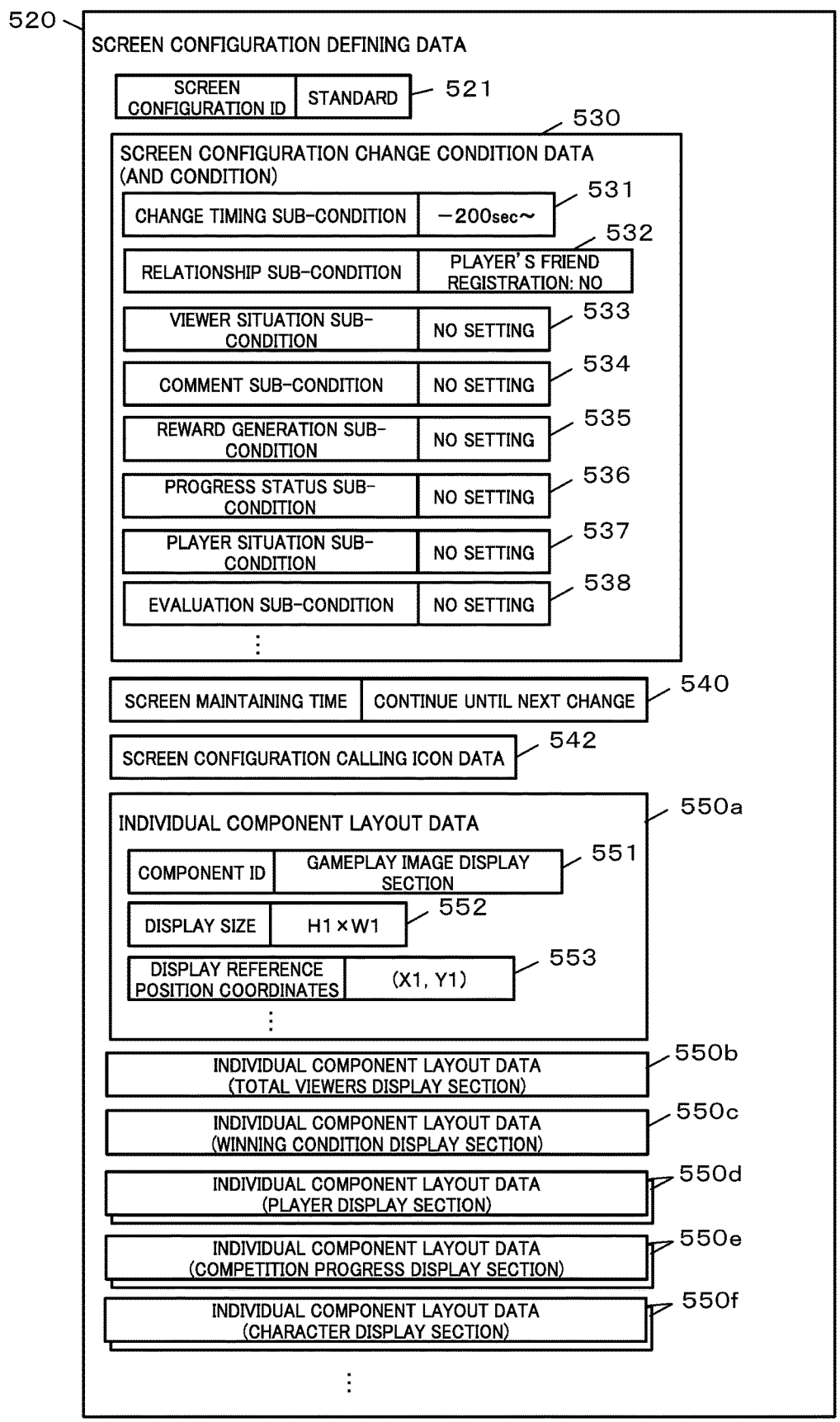
FIG. 12 is a diagram illustrating an example of a data structure of screen configuration defining data regarding the standard screen configuration.
Figure 13:
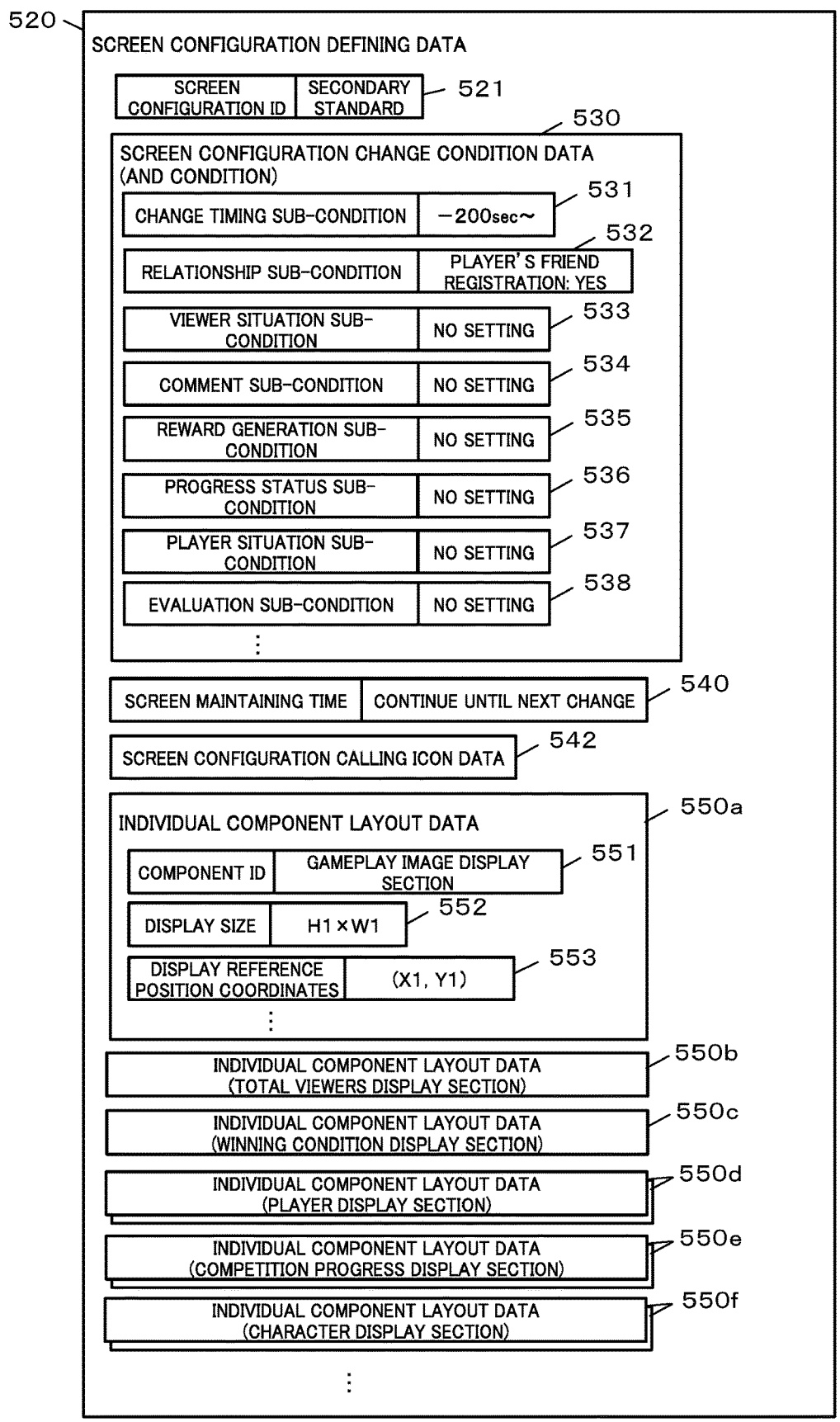
FIG. 13 is a diagram illustrating an example of a data structure of screen configuration defining data regarding the secondary standard screen configuration.
Figure 14:
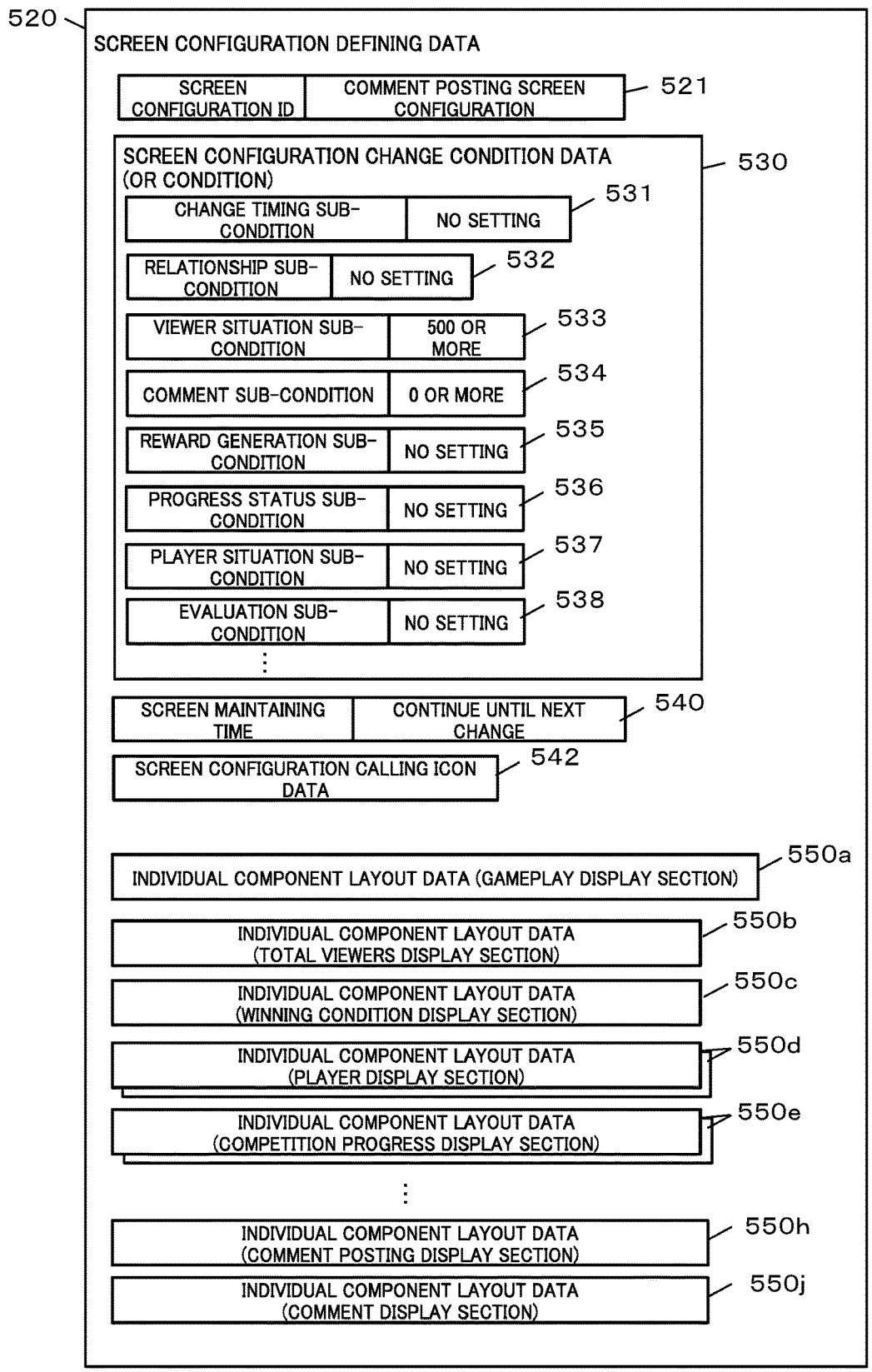
FIG. 14 is a diagram illustrating an example of a data structure of screen configuration defining data regarding the comment posting screen configuration.
Figure 15:
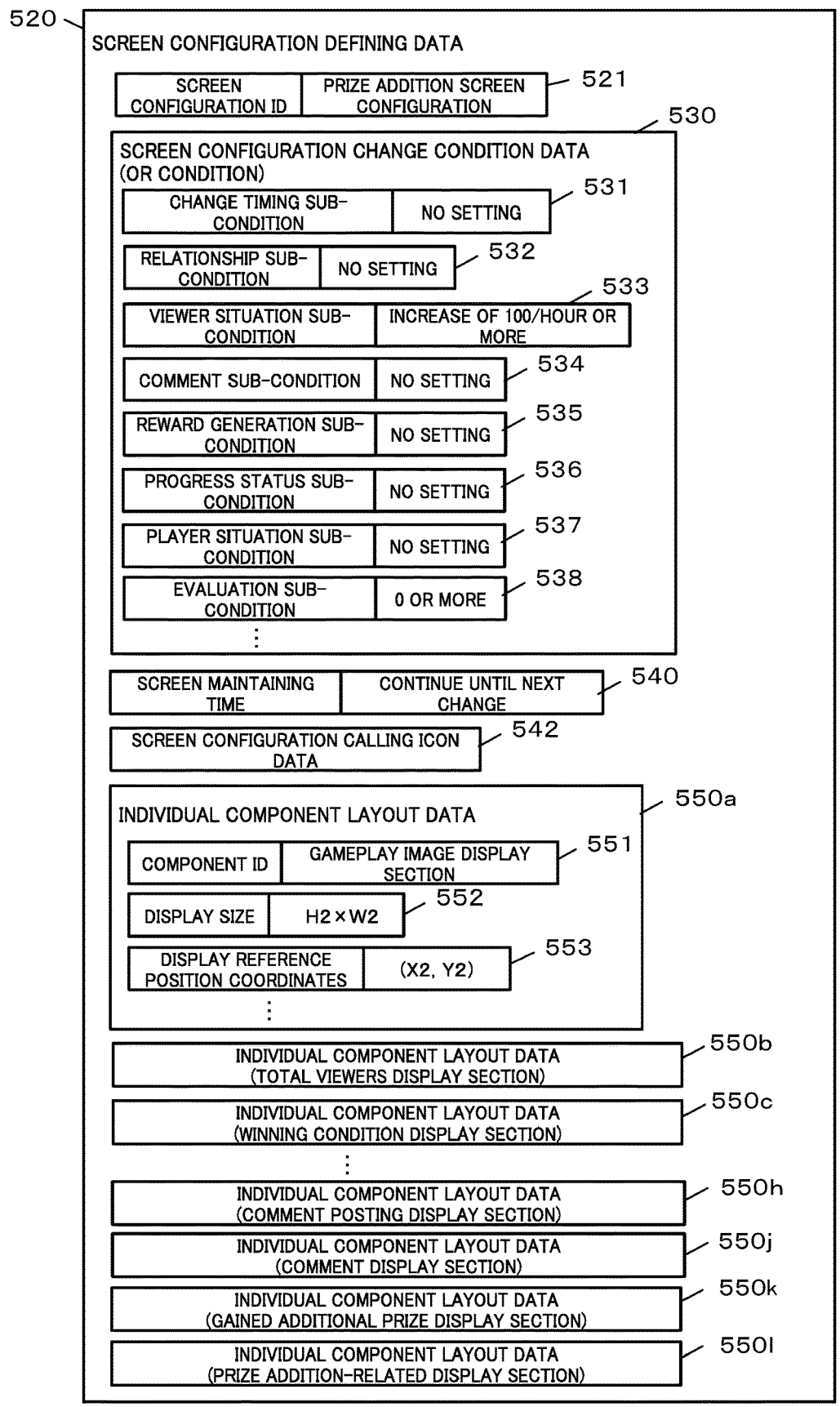
FIG. 15 is a diagram illustrating an example of a data structure of screen configuration defining data regarding the prize addition screen configuration.
Figure 16:
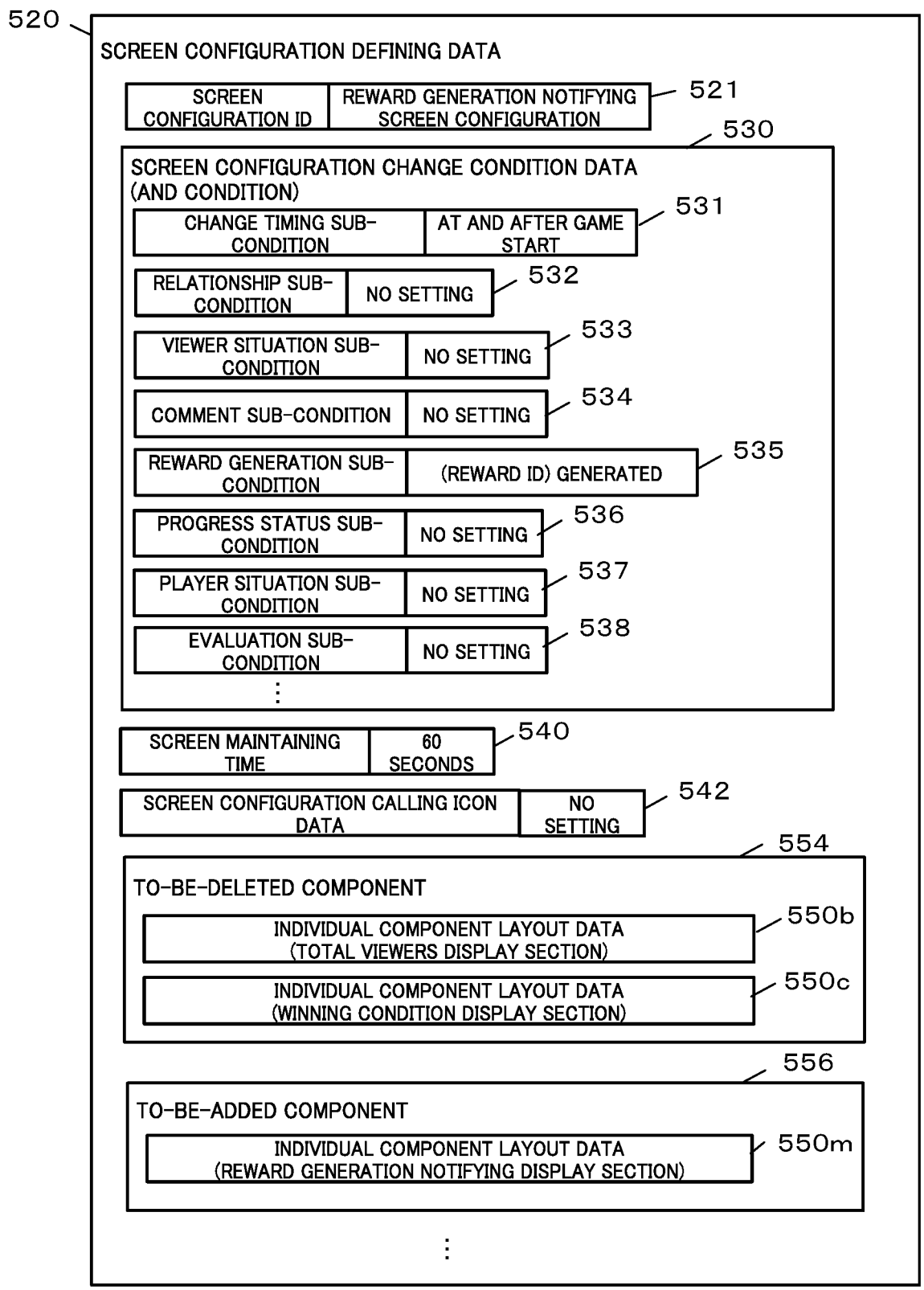
FIG. 16 is a diagram illustrating an example of a data structure of screen configuration defining data regarding the reward generation notifying screen configuration.
Figure 17:
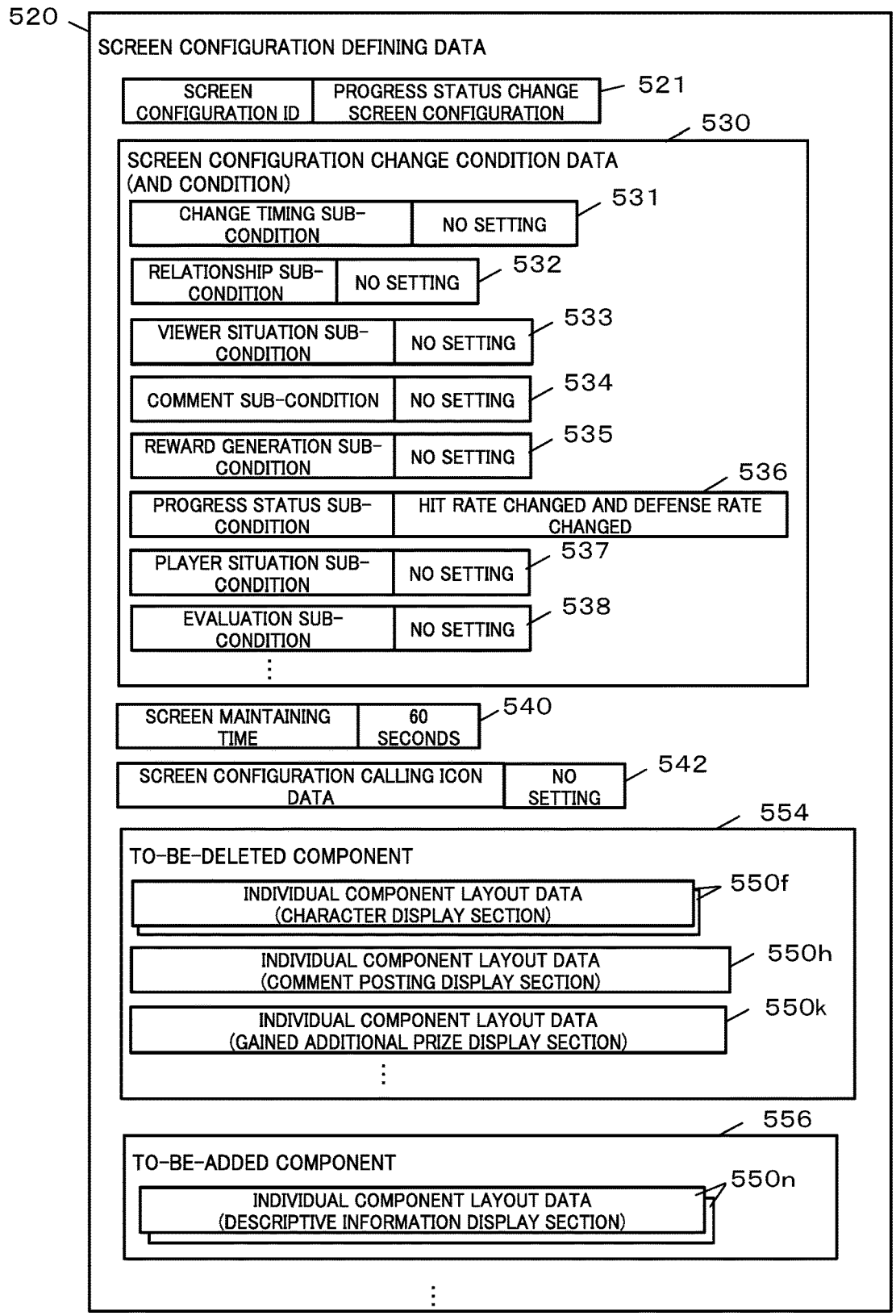
FIG. 17 is a diagram illustrating an example of a data structure of screen configuration defining data regarding the progress status change screen configuration.
Figure 18:
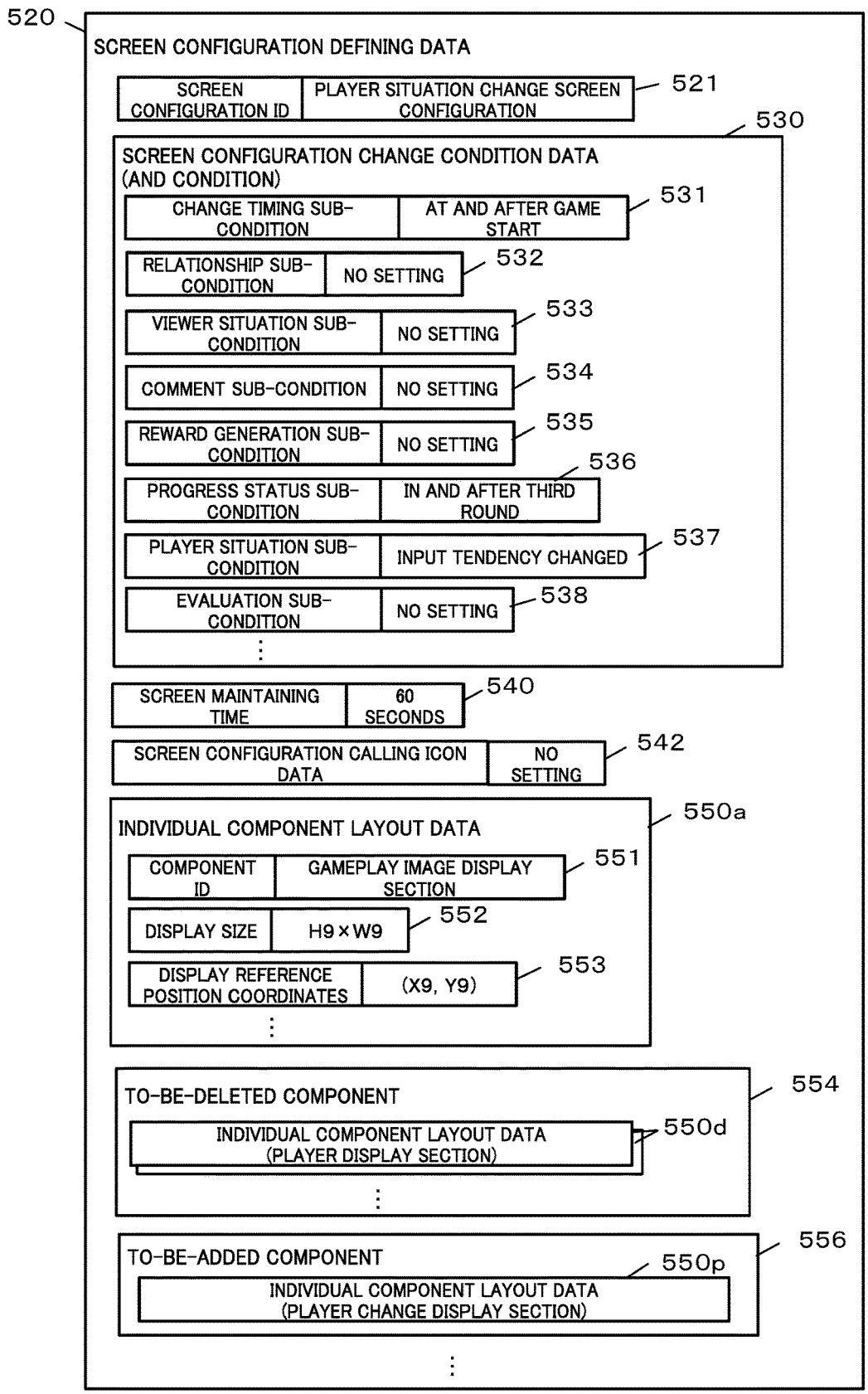
FIG. 18 is a diagram illustrating an example of a data structure of screen configuration defining data regarding the player situational change screen configuration.

FIG. 12 illustrates an example of the standard screen configuration (see FIG. 3). FIG. 13 illustrates an example of the secondary standard screen configuration (see FIG. 4). FIG. 14 illustrates an example of the comment posting screen configuration (see FIG. 5). FIG. 15 illustrates an example of the prize addition screen configuration (see FIG. 6). FIG. 16 illustrates an example of the reward generation notifying screen configuration (see FIG. 7). FIG. 17 illustrates an example of the progress status change screen configuration (see FIG. 8). FIG. 18 illustrates an example of the player situational change screen configuration (see FIG. 9).

The screen configuration change condition data 530 includes various types of data for defining requirements for selecting and applying a screen configuration determined by the defining data. Specifically, the screen configuration change condition data 530 is indicated by one or a plurality of sub-conditions in AND or OR relationship.

In the present embodiment, the sub-conditions include:
1) a change timing sub-condition 531 for defining a requirement regarding a timing with a time elapse from a game start as a reference;

2) a relationship sub-condition 532 for defining a requirement regarding a relationship between a player and a viewer;
3) a viewer situation sub-condition 533 for defining a requirement regarding the total number of viewers;
4) a comment sub-condition 534 for defining a requirement regarding a comment such as a cheer;
5) a reward generation sub-condition 535 for defining a requirement regarding generation of a reward;
6) a progress status sub-condition 536 for defining a requirement regarding a progress status of the game;
7) a player situation sub-condition 537 for defining a requirement regarding a situation of a player; and
8) an evaluation sub-condition 538 for defining a requirement regarding evaluation of a player by a viewer as to prize addition and other factors.

Note that sub-conditions other than these may be included as appropriate.

As the change timing sub-condition 531, a timing to display a watching screen of the screen configuration of interest is set in the form of a time elapse from a game start. Since the example illustrated in FIG. 12 is of the standard screen configuration, a minus value is set as the sub-condition to be selected before a watching start. In a soccer game, a term of halftime may be set to prepare a screen configuration applied only to the halftime, and extended time (e.g., 90 minutes or longer) may be set to prepare a screen configuration applied only to the extended time.

As the relationship sub-condition 532, one of presence and absence of friend registration is set in the present embodiment. Note that the relationship sub-condition 532 may be set as appropriate in accordance with a definition of the employed relationship between the player and the viewer. Setting examples of the relationship sub-condition 532 may include whether the number of matches is equal to or more than a threshold, presence or absence of a play history in the same team, and same or different category of characters used as player characters.

The viewer situation sub-condition 533 defines a threshold condition and a range to change a screen configuration in accordance with the total number of viewers and an increase and a decrease thereof. In the present embodiment, settings may be made as to the comment posting screen configuration (see FIG. 5), the prize addition screen configuration (see FIG. 6), and the reward generation notifying screen configuration (see FIG. 7).

The comment sub-condition 534 is set to change a screen configuration in accordance with posting of a comment such as a cheer by a viewer. For example, a threshold condition (including "0") and a range of the total number of comments, a frequency of comment posting, and the like can be set. When words in comments are included, a setting can be made to change a screen configuration in accordance with posting of a comment including specified words.

The reward generation sub-condition 535 is set to change a screen configuration in association with occurrence of an event of giving a reward to a viewer. In the present embodiment, as to the reward generation notifying screen configuration (see FIG. 7), one of occurrence and non-occurrence of reward giving may be set. Depending on the game content, an event other than reward giving may be set. When a screen configuration is changed in association with occurrence of such an event, a sub-condition as to the event may be prepared in a manner similar to the reward generation sub-condition 535.

The progress status sub-condition 536 can be set by combining in AND or OR relationship one or a plurality of parameter values regarding the game progress to define a given notable change regarding the game progress (game progress status change) required for applying the screen configuration.

In the present embodiment, a setting is made as to the status change screen configuration (see FIG. 8). For example, as to hit points of each of the player characters 4 in a fighting competition game, a setting may be made as "hit points of one of two players become less than 50% of an initial value, AND, a hit point difference between the two players is 30 points or more."

The player situation sub-condition 537 can be set by combining in AND or OR relationship one or a plurality of parameter values regarding a player situation to define a given notable change regarding a player (player situational change).

In the present embodiment, a setting is made as to the player situational change screen configuration (see FIG. 9). For example, as to statistics of operation input by a player, a setting may be made as "among averages of individual kinds of command input per predetermined period of time, an average rate of attack command input has decreased by 20% or more."

The evaluation sub-condition 538 is set to change a screen configuration in accordance with evaluation of a player by a viewer. In the present embodiment, because prize addition is equivalent to the evaluation, the total number of times of prize addition and a threshold condition (including "0") and a range with respect to the total number can be set.

The screen maintaining time 540 defines a limited time period to maintain a state of the screen configuration being applied. In the present embodiment, a definition is made as to the reward generation notifying screen configuration (see FIG. 7) and the progress status change screen configuration (see FIG. 8). Unless a viewer voluntarily inputs a screen configuration calling operation, a predetermined value indicating limitlessness is set to maintain a state of the screen configuration (e.g., the standard screen configuration (see FIG. 3) and the secondary standard screen configuration (see FIG. 4) in the present embodiment) being applied.

The screen configuration calling icon data 542 includes definition data for displaying on the watching screen an icon for a viewer to voluntarily operate to call for the screen configuration. Examples of the data include display positions, display sizes, and icon image data of the standard screen configuration calling icon 13, the secondary standard screen configuration calling icon 14, the comment posting screen configuration calling icon 15, and the prize addition screen configuration calling icon 16.

The individual component layout data 550 (550a, 550b, . . . ) includes data for defining kinds, display positions, display sizes, display modes, and other factors of various display sections displayed on the watching screen of the screen configuration. In the present embodiment, the individual component layout data 550 is prepared for each of the display sections (each of the components of the screen configuration), such as the gameplay image display section 30, the total viewers display section 31, . . . (see FIGS. 3 to 9).

Each of the individual component layout data 550 includes a component ID 551 to indicate which kind of display sections is defined, a display size 552, and display reference position coordinates 553. The display size 552 may be represented by the number of pixels and may be defined by a ratio to a screen size of the touch panel 1506 of the user terminal 1500. Note that data other than these can be included as appropriate. For example, texts and icons displayed by the component may be included. Data of a display mode, such as transparency, brightness, color, and line kinds of the component, may be included.

Depending on the screen configuration, a setting may be also made to the effect that one or some of the components are replaced with components newly added while the screen configuration preceding the screen configuration of interest is maintained.

As in an example of the screen configuration defining data 520 of the reward generation notifying screen configuration illustrated in FIG. 16, a to-be-deleted component 554 may be used to specify components to be deleted for replacement from the preceding screen configuration, and a to-be-added component 556 may be used to specify components to be displayed in place of the components to be deleted.

Referring back to FIG. 11, the reward defining data 570 includes various types of data for defining factors such as details of a reward given to a viewer and a condition to be satisfied for giving the reward in the present embodiment.

Figure 19:
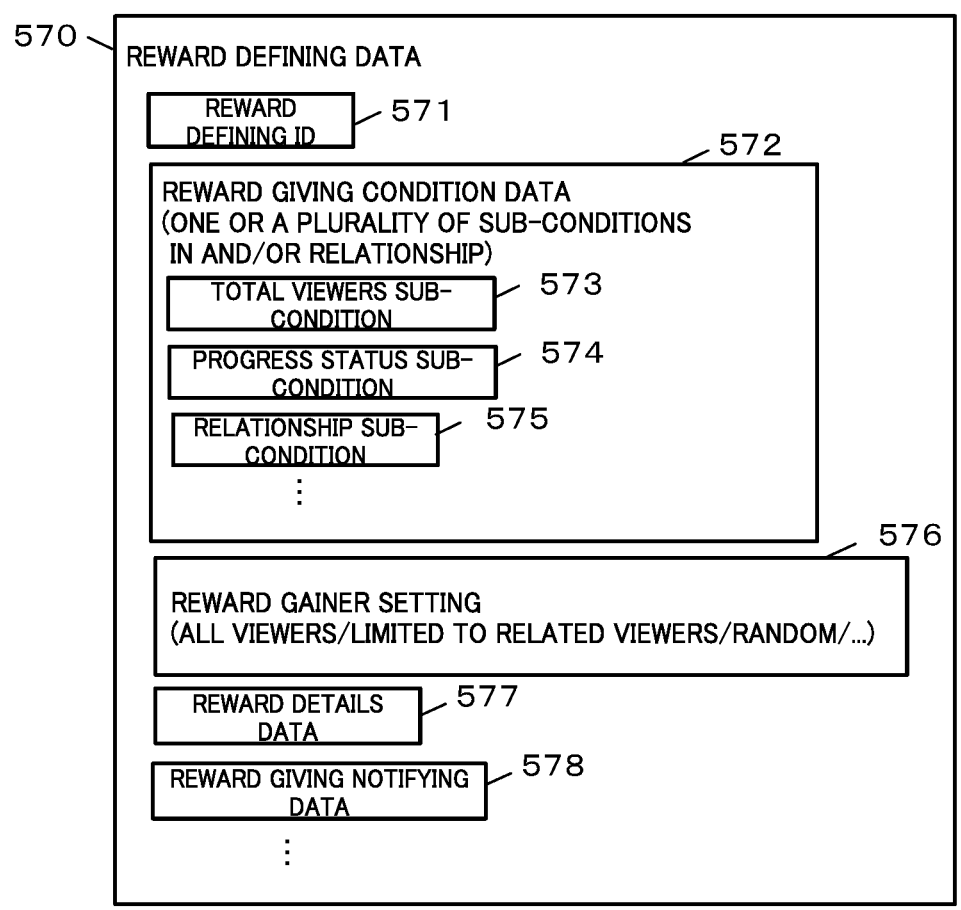
FIG. 19 is a diagram illustrating an example of a data structure of reward defining data.

As illustrated in FIG. 19, for example, each of the reward defining data 570 includes a unique reward defining ID 571, reward giving condition data 572, a reward gainer setting 576, reward details data 577, and reward giving notifying data 578. Note that data other than these can be included as appropriate.

The reward giving condition data 572 is indicated by one or a plurality of sub-conditions in AND or OR relationship. In the present embodiment, the sub-conditions include a viewer situation sub-condition 573, a progress status sub-condition 574, and a relationship sub-condition 575. Note that sub-conditions other than these may be included as appropriate.

In order to set a limit to the number of reward gainers, to limit a definition of reward gainers, and to change reward details in accordance with kinds of reward gainers, different patterns of the reward defining data 570 may be prepared correspondingly. The reward giving notifying data 578 defines details displayed in the reward generation notifying display section 70 (see FIG. 7) regarding the reward.

Figure 20:
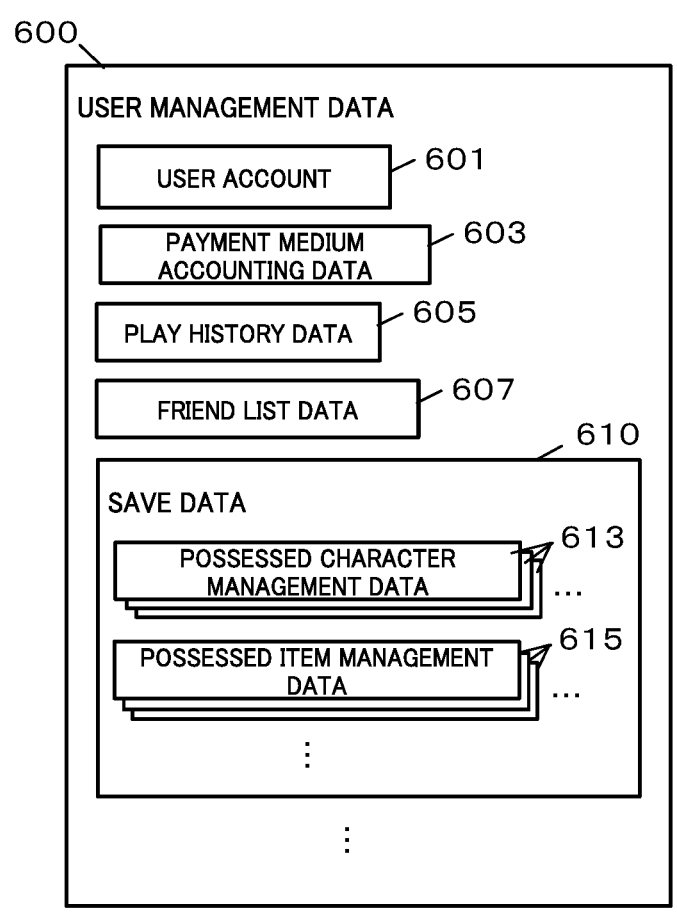
FIG. 20 is a diagram illustrating an example of a data structure of user management data.

Referring back to FIG. 11, the user management data 600 is prepared for each registered user and includes various types of data associated with a unique identification information, namely, an account. As illustrated in FIG. 20, for example, each of the user management data 600 includes a unique user account 601 that has been set at the time of user registration, payment medium accounting data 603, play history data 605, friend list data 607, and save data 610. Note that data other than these can be included as appropriate.

The payment medium accounting data 603 serves as what is known as an account book storing therein information on a charged/consumed amount (of specified parameter values, such as virtual currency points, game currency, specified items, or vitality) of the payment medium for electronic payment associated with the user, information on a reason for the charging/consumption, and information on changed date and time in association with one another. The payment medium accounting data 603 can also be referred to as charge history data or charge information.

The play history data 605 is data in which the past game played timings are stored in time series, and is automatically updated at a login/logout timing. An operation input log as to what operation input has been performed may be included as appropriate. In competition play, for example, a user account of an opponent, a win-loss record at the time, and a total win-loss record may be included as appropriate.

The friend list data 607 is data regarding a relationship between a player and a viewer in the present embodiment. In the present embodiment, the data includes a user account of a different user registered as a friend by the user of interest in association with parameter values of a degree of the relationship with the different user (a friendship level in the case of friend registration).

The save data 610 includes various types of data until the previous gameplay by the user of interest. For example, the data includes 1) possessed character management data 613 for managing possessed characters and 2) possessed item management data 615 for managing possessed items. Note that data other than these can be included as appropriate.

Figure 21:
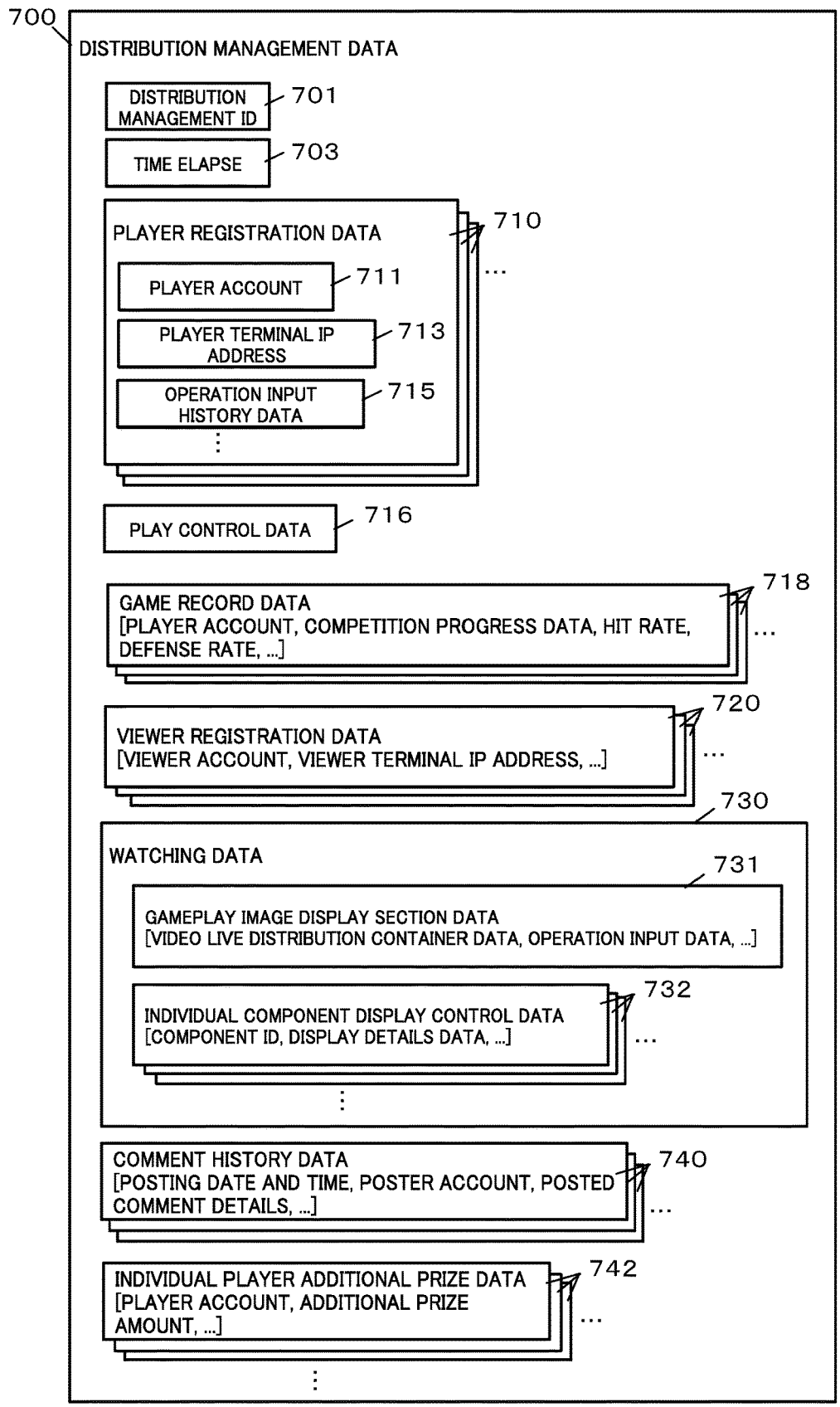
FIG. 21 is a diagram illustrating an example of a data structure of distribution management data.

Referring back to FIG. 11, the distribution management data 700 is prepared for each distribution unit of the esports live distribution and includes various types of data regarding distribution management. As illustrated in FIG. 21, for example, each of the distribution management data 700 includes a unique distribution management ID 701, a time elapse 703 (a minus value at a stage prior to a distribution start time) from the distribution start time as a reference, player registration data 710, player control data 716, game record data 718, viewer registration data 720, watching data 730, comment history data 740, and individual player additional prize data 742. Note that data other than these can be included as appropriate.

The player registration data 710 is prepared for each player. Each of the player registration data 710 includes a player account 711, which is a user account of a user as a player, a player terminal IP address 713 for communicating with the user terminal 1500 (player terminal) used by the player, and operation input history data 715, which is a history of operation input and command input. Note that data other than these can be included as appropriate.

The play control data 716 includes various types of data describing a gameplay situation of the game. In the present embodiment, examples include the latest situation (e.g., a list of ability parameter values of hit points and fighting strength, information of status abnormality such as a paralyzed state, and the number of attack combos) of the player character 4 of each player, and a remaining period of the game. Note that information other than these may be included as appropriate.

The game record data 718 is prepared for each player and includes data of the latest play record of the player. That is, the game record data 718 includes information regarding the competition progress from the player's point of view. Since the game according to the present embodiment is a fighting competition game (a five-set match; best-of-five to win), the game record data 718 includes a player account, competition progress data indicating win sets, a hit rate of attacks by the player character 4 of the player that have hit a player character of an opponent, and a defense rate of conversely defending against attacks by the player character of the opponent.

The viewer registration data 720 is prepared for each user registered as a viewer and includes information to identify the user (e.g., a viewer account, which is a user account of the user as a viewer), and a viewer terminal IP address for communicating with the user terminal 1500, namely, a viewer terminal, used by the user. Note that data other than these can be included as appropriate. For example, data such as a port number and an access key may be included as appropriate.

The watching data 730 is data for displaying the watching screens W3 (see FIG. 3) to W9 (see FIG. 9) to implement the esports live distribution to the user terminal 1500 of a viewer. In the present embodiment, the watching data 730 includes gameplay image display section data 731 and individual component display control data 732.

The gameplay image display section data 731 is data required for displaying the progress of the game in the gameplay image display section 30, which is one of the components according to the present embodiment. Details of the data can be set as appropriate in accordance with a method for implementing the esports live distribution. In adopting a live streaming distribution method, for example, the gameplay image display section data 731 corresponds to container data. In rendering the progress of the game displayed in the gameplay image display section 30 on the user terminal 1500, the gameplay image display section data 731 corresponds to operation input data indicating details of operation input by each player.

Information required for displaying components other than the gameplay image display section 30 is prepared as the individual component display control data 732 for each component. Each of the individual component display control data 732 includes a component ID (corresponding to the component ID 551 in FIG. 12) indicating where the data is applied and display details data in association with each other.

The comment history data 740 is prepared for each comment input and posted with the comment posting display section 50 (see FIG. 5). Each of the comment history data 740 includes a posting date and time, a poster account, which is a user account of a viewer as a poster, and posted comment details data. Note that data other than these can be included as appropriate.

The individual player additional prize data 742 is prepared for each player and includes data describing the latest situation of additional prize to the player that has been input to the prize addition-related display section 60 (see FIG. 6). In the present embodiment, an initial value is "0", and each time the additional prize gainer selecting icon 61 (61a, 61b, . . . ) is touch-operated, a predetermined amount of additional prize is added. When an item is selected from items possessed by a viewer himself/herself, and given as additional prize, information of kinds and amounts of the items may be included as appropriate.

Figure 22:
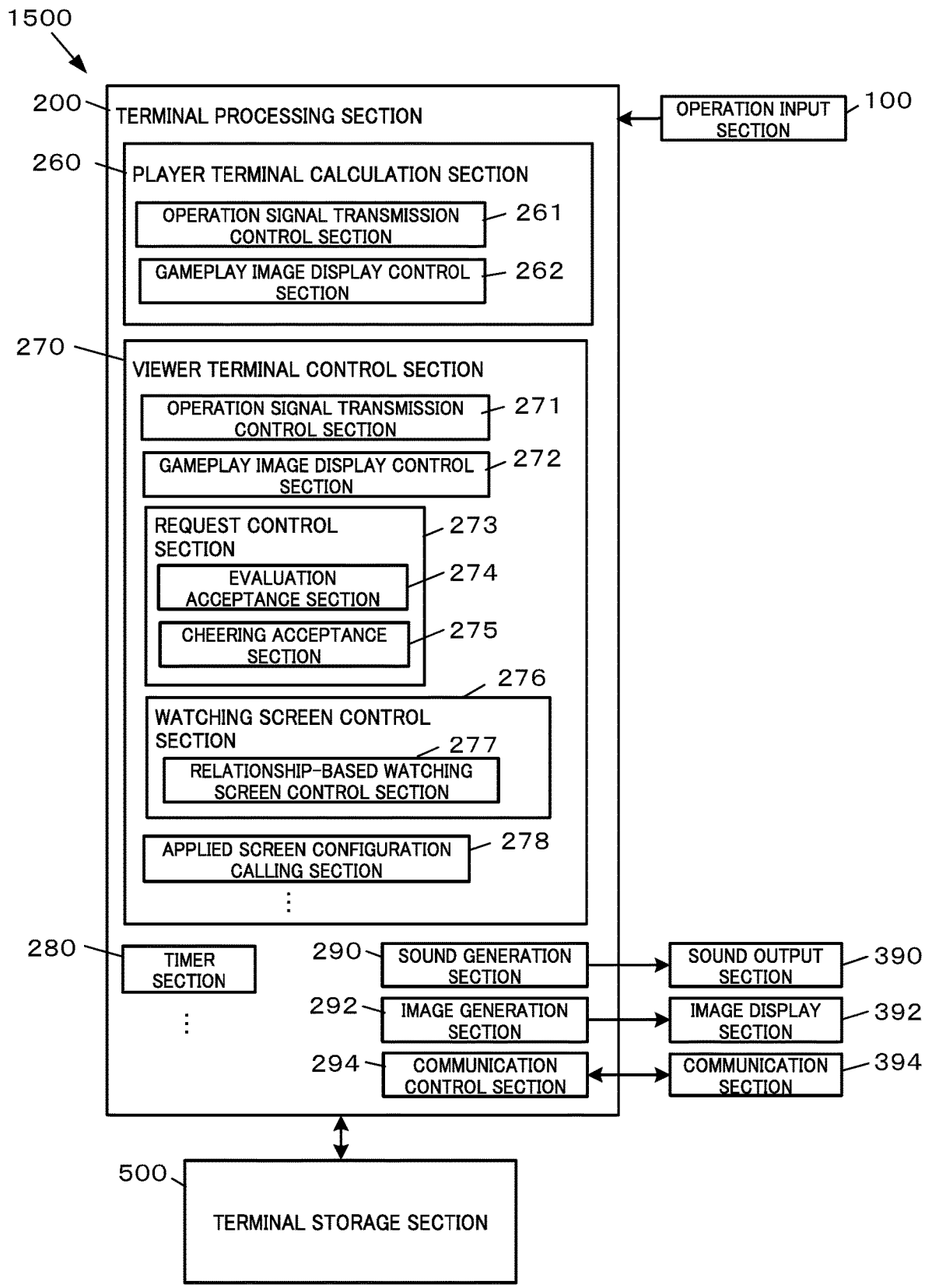
FIG. 22 is a functional block diagram illustrating an example of a functional configuration of the user terminal.

FIG. 22 is a functional block diagram illustrating an example of the functional configuration of the user terminal 1500 according to the present embodiment. The user terminal 1500 according to the present embodiment includes an operation input section 100, a terminal processing section 200, a sound output section 390, an image display section 392, a communication section 394, and a terminal storage section 500.

The operation input section 100 outputs an operation input signal, based on various operations input by the player, to the terminal processing section 200. The operation input section 100 can be implemented with a push switch, a joystick, a touch pad, a track ball, an accelerometer, a gyro, a CCD module, or the like. The operation input section 100 corresponds to the arrow key 1502, the button switch 1504, and the touch panel 1506 in FIG. 2.

The terminal processing section 200 is implemented with electronic parts, such as a microprocessor (e.g., CPU and GPU), an ASIC, and an IC memory. The terminal processing section 200 performs input/output control to exchange data with each of the functional sections including the operation input section 100 and the terminal storage section 500. The terminal processing section 200 executes various calculation processes based on a predetermined program or data, the operation input signal from the operation input section 100, and various types of data received from the server system 1100 to control the operation of the user terminal 1500. The terminal processing section 200 corresponds to the control board 1550 in FIG. 2.

The terminal processing section 200 according to the present embodiment includes a player terminal calculation section 260, a viewer terminal calculation section 270, a timer section 280, a sound generation section 290, an image generation section 292, and a communication control section 294.

The player terminal calculation section 260 performs various kinds of control to make a user's own terminal function as a player terminal. That is, the player terminal calculation section 260 implements a function as a gameplay terminal for gameplay as a player related to live distribution of a gameplay image or as a gameplay terminal for personal gameplay irrespective of live distribution of a gameplay image. Specifically, the player terminal calculation section 260 includes an operation signal transmission control section 261 and a gameplay image display control section 262.

The operation signal transmission control section 261 performs a process of transmitting various types of data and a request to the server system 1100 in accordance with an operation on the operation input section 100.

The gameplay image display control section 262 performs control for displaying a gameplay image based on various types of data received from the server system 1100. In the present embodiment, the gameplay image displayed on the player terminal has a configuration generated by the server system 1100. Alternatively, a configuration generated by the user terminal 1500 may also be employed. In this case, the gameplay image display control section 262 is in charge of controlling an object disposed in a virtual three-dimensional space for generating a 3DCG, for example.

The viewer terminal control section 270 makes the user terminal function as a viewer terminal.

The viewer terminal control section 270 according to the present embodiment includes an operation signal transmission control section 271, a gameplay image display control section 272, a request control section 273, a watching screen control section 276, and an applied screen configuration calling section 278. Note that functional sections other than these may be included as appropriate.

The operation signal transmission control section 271 performs control for transmitting the operation input signal as the viewer terminal to the server system 1100.

The gameplay image display control section 272 performs display control of a gameplay image to display the gameplay image in the gameplay image display section 30 of the watching screen. In order to render the gameplay image on the user terminal 1500 in response to distribution of the operation input signal input by the player terminal, the gameplay image display control section 272 performs rendering control.

The request control section 273 implements an acceptance function of viewer actions (evaluation and cheering) freed in accordance with a change of the screen configuration and makes a request of an accepted result to the server system 1100. In the present embodiment, the request control section 273 includes an evaluation acceptance section 274 and a cheering acceptance section 275.

When the number of viewer users satisfies a predetermined threshold condition, the evaluation acceptance section 274 starts accepting evaluation of a player user's gameplay by a viewer user. In the present embodiment, the evaluation acceptance corresponds to acceptance of a comment by the comment posting display section 50 (see FIG. 5).

When the number of viewer users satisfies a predetermined threshold condition, the cheering acceptance section 275 starts accepting various comments such as cheers to a player user by a viewer user.

That is, the request control section 273 according to the present embodiment makes requests in accordance with operation inputs to the comment posting display section 50 and the prize addition-related display section 60 (the former is a comment posting request, and the latter is a prize addition request).

The watching screen control section 276 controls the watching screen to change a screen configuration of the watching screen based on whether a screen configuration change condition for changing a screen configuration of the watching screen during live watching is satisfied.

Specifically, the watching screen control section 276 includes a relationship-based watching screen control section 277.

The relationship-based watching screen control section 277 controls the watching screen to change the screen configuration based on whether a predetermined relationship is set between the player user and the viewer user. In the present embodiment, the screen configuration thus changed corresponds to the secondary standard screen configuration (see FIG. 4).

The watching screen control section 276 determines whether a screen configuration change condition based on a game progress status is satisfied. When this screen configuration change condition is satisfied, the watching screen control section 276 controls and makes the watching screen have a screen configuration including a component to display descriptive information of the game progress status. In the present embodiment, this corresponds to display of the competition progress display section 34 (see FIG. 3) and the descriptive information display section 80 (see FIG. 8).

The watching screen control section 276 determines whether a screen configuration change condition based on an operation situation of a player user is satisfied. When this screen configuration change condition is satisfied, the watching screen control section 276 controls and makes the watching screen have a screen configuration including a component to display descriptive information of the operation situation of the player user. In the present embodiment, this corresponds to display of the player change display section 90 (see FIG. 9).

The watching screen control section 276 determines whether a screen configuration change condition based on a watching situation of a viewer user is satisfied. When this screen configuration change condition is satisfied, the watching screen control section 276 controls and makes the watching screen have a screen configuration including a component to display the number of viewer users. In the present embodiment, this screen configuration corresponds to the standard screen configuration (see FIG. 3) and the comment posting screen configuration (see FIG. 5).

The watching screen control section 276 can control the watching screen to change the screen configuration based on whether a predetermined relationship is set between the player user and the viewer user. As to the viewer user having the predetermined relationship set with the player user, the watching screen control section 276 can control and make the watching screen have a screen configuration including a component to display the relationship. In the present embodiment, the predetermined relationship is having a setting of friend registration, and this screen configuration corresponds to the secondary standard screen configuration (see FIG. 4) including the relationship display section 40 to display the relationship.

The watching screen control section 276 determines whether a screen configuration change condition based on evaluation accepted from a viewer terminal is satisfied. When this screen configuration change condition is satisfied, the watching screen control section 276 controls and makes the watching screen have a screen configuration including a component to display the evaluation. In the present embodiment, this screen configuration corresponds to the prize addition screen configuration (see FIG. 6) including the prize addition-related display section 60 and the gained additional prize display section 64 as the component to display the evaluation.

The watching screen control section 276 is related to reward giving and determines whether a screen configuration change condition based on whether a reward has been given is satisfied. When this screen configuration change condition is satisfied, the watching screen control section 276 controls and makes the watching screen have a screen configuration including a component to display the reward giving. In the present embodiment, this screen configuration corresponds to the reward generation notifying screen configuration (see FIG. 7) including the reward generation notifying display section 70 to display the reward giving.

The watching screen control section 276 is related to cheering players and determines whether a screen configuration change condition based on accepted cheering is satisfied. When this screen configuration change condition is satisfied, the watching screen control section 276 controls and makes the watching screen have a screen configuration including a component to display the cheering. In the present embodiment, this screen configuration corresponds to the comment posting screen configuration (see FIG. 5) including the comment display section 53 as the component to display the cheering.

The applied screen configuration calling section 278 changes a screen configuration of the watching screen by calling for and re-applying the screen configuration that has already been applied by the watching screen control section 276, in response to calling operation input by a user equipped with his/her own terminal. In the present embodiment, this corresponds to recovery of the screen configuration of the watching screen in accordance with operation input to various calling icons (e.g., the standard screen configuration calling icon 13 in FIG. 4).

The sound generation section 290 is implemented with a processor, such as a digital signal processor (DSP) or a sound synthesizing IC, an audio codec capable of reproducing a sound file, or the like. Based on a processing result by the gameplay image display control section 262, the sound generation section 290 generates a sound signal for sound effects, a BGM, various operation sounds, and the like related to the game, and outputs the sound signal thus generated to the sound output section 390.

The sound output section 390 is implemented with a device that outputs sound, such as sound effects or BGM, based on the sound signal received from the sound generation section 290. The sound output section 390 corresponds to the speaker 1510 in FIG. 2.

The image generation section 292 is implemented, for example, with a processor (e.g., a GPU or a DSP), a video signal IC, a program (e.g., video codec), a drawing frame IC memory (e.g., frame buffer), and the like. The image generation section 292 generates a display image in every frame (e.g., 1/60th of a second) and outputs image signals of the generated display image to the image display section 392.

The image display section 392 displays various game images based on the image signals input from the image generation section 292. The image display section 392 can be implemented with an image display device, such as a flat panel display, a cathode ray tube (CRT), a projector, or a head-mounted display. In the present embodiment, the image display section 392 corresponds to the touch panel 1506 illustrated in FIG. 2.

The communication control section 294 performs a data process for data communications, and exchanges data with an external device through the communication section 394. The communication section 394 connects to the communication line 9 to implement communications. For example, the communication section 394 is implemented with a transceiver, a modem, a terminal adapter (TA), a jack for a communication cable, a control circuit, and the like, and corresponds to the wireless communication module 1553 in FIG. 2.

The terminal storage section 500 stores therein a program for implementing various functions for causing the terminal processing section 200 to entirely control the user terminal 1500, various types of data, and the like. The terminal storage section 500 is used as a work area for the terminal processing section 200, and temporarily stores a result of calculation performed by the terminal processing section 200 in accordance with various programs, input data received from the operation input section 100, and the like. These functions are implemented with an IC memory (e.g., RAM and ROM), a magnetic disk (e.g., hard disk), an optical disk (e.g., CD-ROM and DVD), or the like. The terminal storage section 500 corresponds to the IC memory 1552 and the memory card 1540 in the control board 1550 illustrated in FIG. 2.

Figure 23:
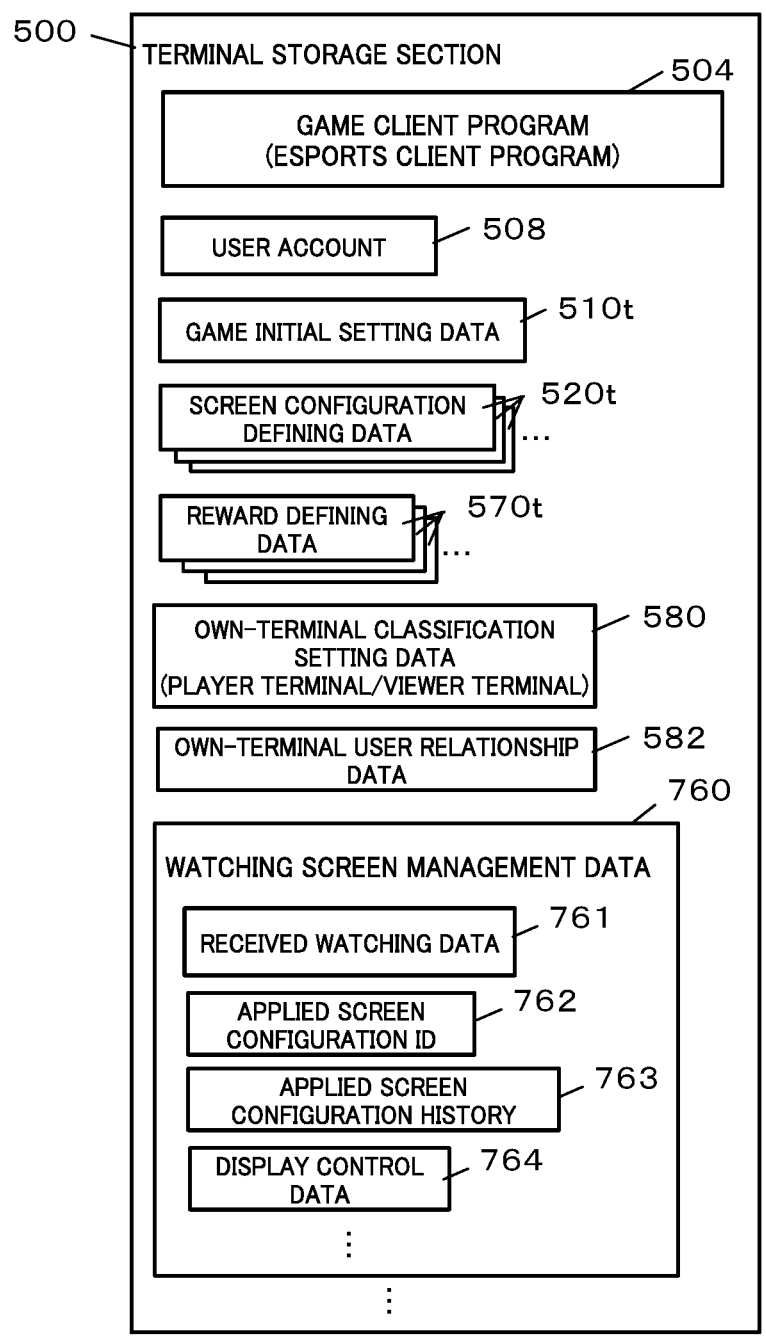
FIG. 23 is a diagram illustrating an example of programs and data stored in a terminal storage section.

As illustrated in FIG. 23, for example, the terminal storage section 500 according to the present embodiment stores therein a game client program 504, a user account 508 indicating a user equipped with his/her own terminal that has been input at the time of log-in, game initial setting data 510$t$, screen configuration defining data 520$t$, reward defining data 570$t$, own-terminal classification setting data 580, own-terminal user relationship data 582, and watching screen management data 760. Note that programs and data other than these can be stored as appropriate.

The game client program 504 is application software that implements functions of the player terminal calculation section 260 and the viewer terminal control section 270 when read and executed by the terminal processing section 200. In the present embodiment, the game client program 504 is a copy of the distributed game client program 505 (see FIG. 11) provided from the server system 1100.

The game client program 504 may be an exclusive client program or include a web browser program and a plugin that implements an interactive image display, depending on a technique and a method for implementing an online game.

The user account 508 is a result of input by a user in a log-in procedure.

When a user's own terminal is used as a player terminal in the esports live distribution or when a user's own terminal is used for gameplay, the game initial setting data 510$t$ is stored by obtaining a copy of data in the same title from the server system 1100 as necessary. In the present embodiment, the gameplay image in using the user's own terminal as a player terminal or a gameplay terminal has a configuration generated by the server system 1100. Therefore, basically, there is no need to store the gameplay image. However, when the gameplay image is generated by the user's own terminal, the setting data is essential.

When the user's own terminal is used as a viewer terminal, the screen configuration defining data 520$t$ and the reward defining data 570$t$ are stored by respectively obtaining copies of data in the same titles from the server system 1100.

The own-terminal classification setting data 580 stores information as to whether the user's own terminal is a player terminal or a viewer terminal. In the present embodiment, a menu screen displayed after a start-up of the game client offers three options: gameplay with the user's own terminal; registration as a player of esports; and watching esports. When the first and second menu items are selected from the three options, his/her own terminal is set as a player terminal. When the third menu item is selected, his/her own terminal is set as a viewer terminal.

The own-device user relationship data 582 is data indicating a relationship between the player and the viewer equipped with his/her own terminal (presence or absence of friend registration in the present embodiment). The own-device user relationship data 582 is obtained from the server system 1100 prior to a watching start.

The watching screen management data 760 is created when the user's own terminal functions as a viewer terminal, and includes various types of data required for display control of the watching screen. Specifically, the watching screen management data 760 includes 1) received watching data 761 stored when the watching data 730 (see FIG. 21) distributed from the server system 1100 is received, 2) an applied screen configuration ID 762 indicating a screen configuration ID (the screen configuration ID 521 in FIG. 12) of a screen configuration applied to the present watching screen, 3) an applied screen configuration history 763 storing in time series screen configuration IDs of screen configurations that have been applied so far, and 4) display control data 764 of the watching screen. Note that data other than these can be included as appropriate.

[Operations]

Next, a flow of a process in the server system 1100 will be described.

Figure 24:
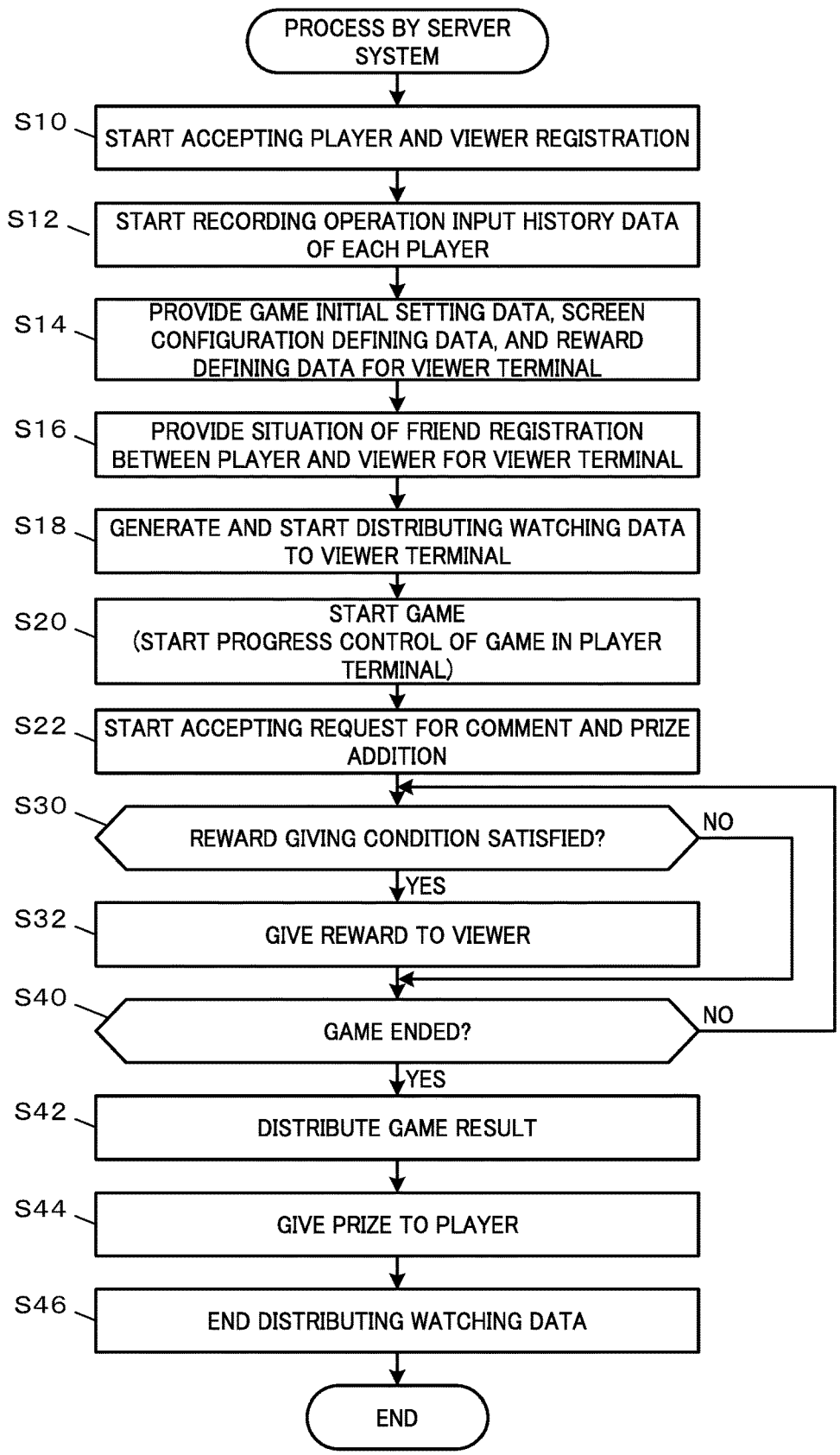
FIG. 24 is a flowchart illustrating a flow of a process in the server system.

FIG. 24 is a flowchart illustrating the flow of the process in the server system 1100 according to the present embodiment. The flow of the process described herein is implemented with the server processing section 200$s$ executing the server program 503.

First, the server system 1100 starts accepting registration of players and viewers, and creates the player registration data 710 and the viewer registration data 720 in the distribution management data 700 (see FIG. 21) in accordance with the accepted registration (step S10). As to the time elapse 703, time measurement starts from a predetermined minus value. That is, countdown is started until a game start.

In a period prior to the game start, the server system 1100 starts recording the operation input history data 715 regarding the players (step S12). As for the viewers, the game initial setting data 510, the screen configuration defining data 520, and the reward defining data 570 are distributed to a viewer terminal of each of the viewers (step S14). Regarding each of the viewers with a viewer terminal, a relationship with each of the players, namely, a situation of friend registration in the present embodiment, is searched and provided for the viewer terminal (step S16).

Next, the server system 1100 generates the watching data 730 (see FIG. 21), starts distribution (step S18), and starts a game (step S20). That is, the server system 1100 starts game progress control regarding the game and starts updating the play control data 716 and the game record data 718 in the distribution management data 700 (see FIG. 21) successively.

After the game start, the server system 1100 starts accepting a comment request and a prize addition request from the viewer terminal (step S22).

When a comment request is accepted, data for displaying the comment on the screen is added to the individual component display control data 732 (see FIG. 21) corresponding to the comment display section 53 (see FIG. 5). A prize addition request includes information indicating an additional-prize gainer. Consequently, when a prize addition request is accepted, the individual player additional prize data 742 (see FIG. 21) suited to the additional-prize gainer is updated.

Next, the server system 1100 refers to the reward defining data 570 (see FIGS. 11 and 13), and when a reward giving condition is satisfied (YES in step S30), a reward indicated by the reward details data 577 is given to a viewer corresponding to the reward gainer setting 576 (step S32).

When the game is ended (YES in step S40), the server system 1100 distributes a game result (step S42) and gives a prize to a player (step S44). When the prize is given, an additional prize set in the individual player additional prize data 742 is also added. Then, distribution of the watching data 730 is ended (step S46) to end a series of the process.

Figure 25:
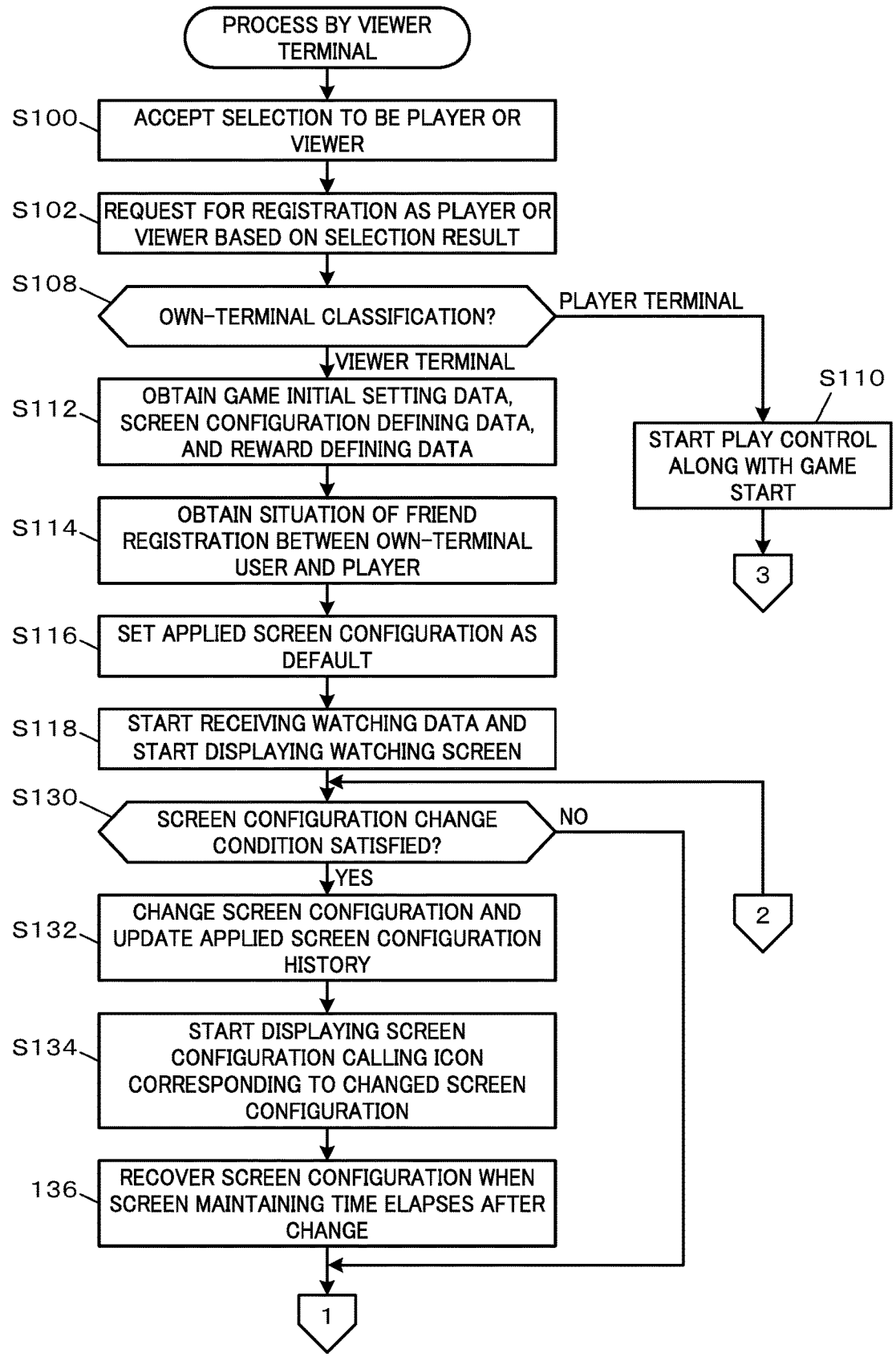
FIG. 25 is a flowchart illustrating a flow of a process in the user terminal.
Figure 26:
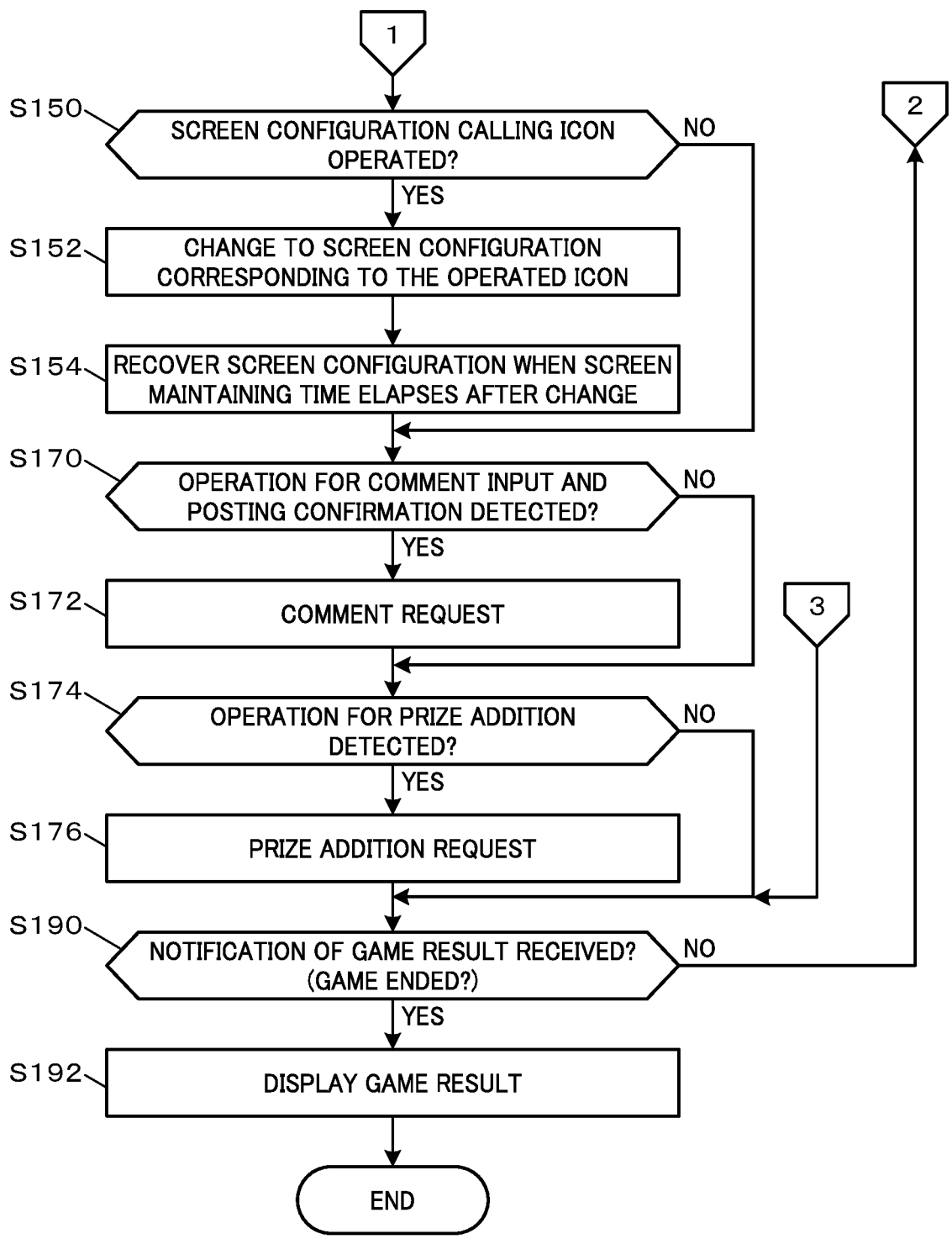
FIG. 26 is a flowchart continuing from FIG. 25.

FIGS. 25 and 26 is a flowchart illustrating a flow of a process in the user terminal 1500 according to the present embodiment. The flow of the process described herein is implemented with the terminal processing section 200 executing the game client program 504.

The user terminal 1500 first accepts selection to be a player or a viewer by a user equipped with his/her own terminal (step S100). For example, the following items are added to a main menu: "gameplay," "register as a player in esports live distribution," and "watch esports." When the user selects the first and second items of these three, the own-terminal classification setting data 580 (see FIG. 23) is set to "player terminal." When the user selects the third item, the own-terminal classification setting data 580 is set to "viewer terminal."

In accordance with a selection result, the user terminal 1500 accesses the server system 1100 to make a request for player registration or viewer registration (step S102).

Next, when the user's own terminal classification is "player terminal" (player terminal in step S108), the user terminal 1500 starts the game related to live distribution of a gameplay image or starts personal gameplay and starts control as a game client (step S110).

When the user's own terminal classification is "viewer terminal" (viewer terminal in step S108), the user terminal 1500 accesses the server system 1100 and obtains copies of the game initial setting data 510, the screen configuration defining data 520, and the reward defining data 570 (see FIG. 11) (step S112). The user terminal 1500 stores these copies as the game initial setting data 510t, the screen configuration defining data 520t, and the reward defining data 570t (see FIG. 23).

Moreover, the user terminal 1500 obtains a situation of friend registration between the viewer as the own-terminal user and the player and sets the situation in the own-terminal user relationship data 582 (step S114; see FIG. 23).

Next, the user terminal 1500 sets "standard screen configuration" or "secondary standard screen configuration" in the applied screen configuration ID 762 in accordance with a setting of the own-terminal user relationship data 582 and makes the same setting in the applied screen configuration history 763 (step S116; see FIG. 23).

Then, the user terminal 1500 starts receiving the watching data 730 (see FIG. 21) and starts displaying a watching screen to which a screen configuration indicated by the applied screen configuration ID 762 is applied (step S118).

After the display start of the watching screen, the user terminal 1500 monitors whether a condition indicated by the screen configuration change condition data 530 of the screen configuration defining data 520t is satisfied. When the screen configuration change condition is satisfied (YES in step S130), the user terminal 1500 changes the display control data 764 to change the screen configuration of the watching screen in accordance with the corresponding screen configuration defining data 520t, and adds a screen configuration ID of the corresponding screen configuration defining data 520t to the applied screen configuration history 763 (step S132).

Next, the user terminal 1500 starts displaying a screen configuration calling icon corresponding to the screen configuration thus changed (step S134). When the screen maintaining time 540 (see FIG. 12) of the corresponding screen configuration defining data 520t elapses after changing the screen configuration this time, the immediately preceding screen configuration registered in the applied screen configuration history 763 is recovered (step S136). When a set value of the screen maintaining time 540 is "0," step S136 is substantially regarded to have been skipped.

Referring now to FIG. 26, when operation input to the screen configuration calling icon is detected (YES in step S150), the user terminal 1500 makes a change to a screen configuration corresponding to the screen configuration calling icon that has been operated (step S152), and recovers the screen configuration after the screen maintaining time 540 in the changed screen configuration has elapsed (step S154).

As a result of the screen configuration change, the comment posting display section 50 (see FIG. 5) and the prize addition-related display section 60 (see FIG. 6) are displayed on the watching screen in some cases.

When comment input and posting confirmation operation input to the comment posting display section 50 (see FIG. 5) are detected (YES in step S170), the user terminal 1500 accesses the server system 1100 to make a request for comment posting (step S172).

When input to the prize addition-related display section 60 (see FIG. 6) is detected (YES in step S174), the user terminal 1500 accesses the server system 1100 to make a request for prize addition (step S176).

After the display start of the watching screen, when a notification of a game result is received from the server system 1100, the user terminal 1500 determines that the game has been ended (YES in step S190), and displays the received game result (step S192) to end a series of the process.

As described above, the present embodiment enables provision of a technique regarding the live distribution of the gameplay image so as to improve how to provide information on the watching screen to facilitate the viewer's understanding of situations. Furthermore, in accordance with improvement of information provision, interest in the live watching of the gameplay image can be enhanced.

[Modifications]

The embodiment that has been described above should not be construed in a limiting sense. Various modifications may be made as appropriate, such as adding other elements, omitting some of the elements, or changing some of the elements.

33

[First Modification]

For example, in the above-described embodiment, as the base of the esports live distribution, an online game is implemented with a client-server computer system. However, the online game may be implemented with a computer system in which a plurality of user terminals 1500 can establish a peer-to-peer connection. In this case, some of the user terminals 1500 may be made to implement the functions as the server system 1100. Alternatively, the plurality of user terminals 1500 may cooperate to implement the functions.

[Second Modification]

In the above-described embodiment, watching data regarding the live distribution of the gameplay image is centrally distributed with the client-server network system. However, the watching data may be distributed with a P2P network system.

[Third Modification]

In the above-described embodiment, content of the game as the base of the esports live distribution is a fighting competition game, for example. However, game genres and play modes as the base are not limited to this but may be set as appropriate. Examples may include a puzzle game of competing for time to complete a puzzle, a real-time strategy simulation game or shooting game played by a plurality of players divided into teams to compete against each other, a racing game of competing for time, and a music game of playing the same piece and competing for a reward. The game may not necessarily be a competition game.

[Fourth Modification]

In the above-described embodiment, the watching screen is generated and controlled on each of the user terminals 1500 as a viewer terminal. This, however, should not be construed in a limiting sense. For example, the secondary standard screen configuration and the applied screen configuration calling function by operating the calling icons (the standard screen configuration calling icon 13, the secondary standard screen configuration calling icon 14, . . . ) by the user may be omitted, and the server system 1100 may generate a watching screen and distributes the watching screen of a common screen configuration to all of the viewer terminals.

Figure 27:
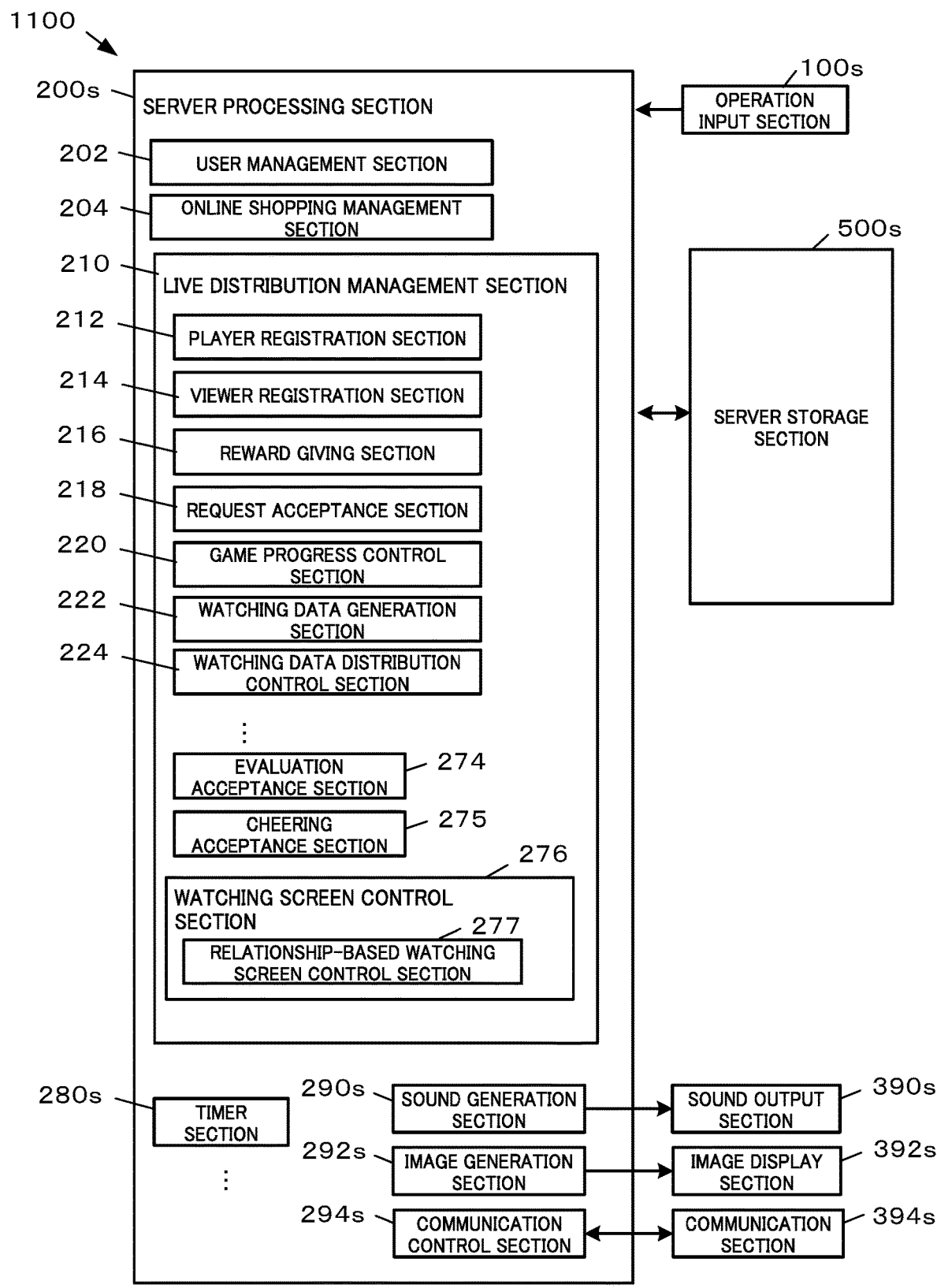
FIG. 27 is a functional block diagram illustrating an example of a functional configuration of a server system according to a modification.

In this case, the server system 1100 has a functional configuration, as illustrated in FIG. 27, for example. Specifically, the server system 1100 includes the evaluation acceptance section 274, the cheering acceptance section 275, and the watching screen control section 276. When this configuration is employed, the watching data 730 (see FIG. 21) is watching screen data.

Figure 28:
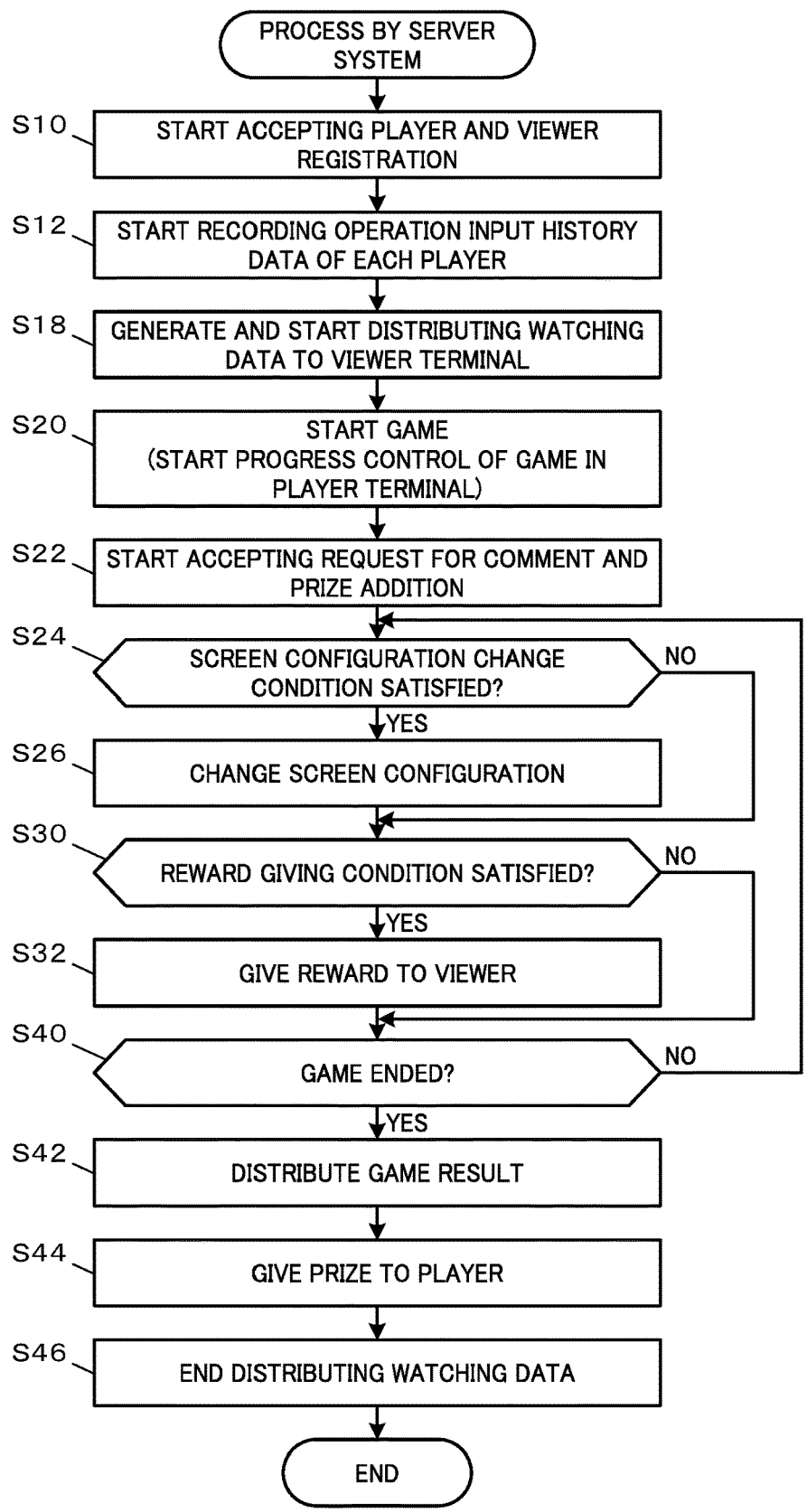
FIG. 28 is a flowchart illustrating a flow of a process in the server system according to the modification.

In a flow of a process of the server system 1100 in this case, as illustrated in FIG. 28, for example, step S24 and step S26 equivalent to step S130 and step S132 (see FIG. 25) in the process of the viewer terminal in the above-described embodiment may be added between a game start and a game end.

Figure 29:
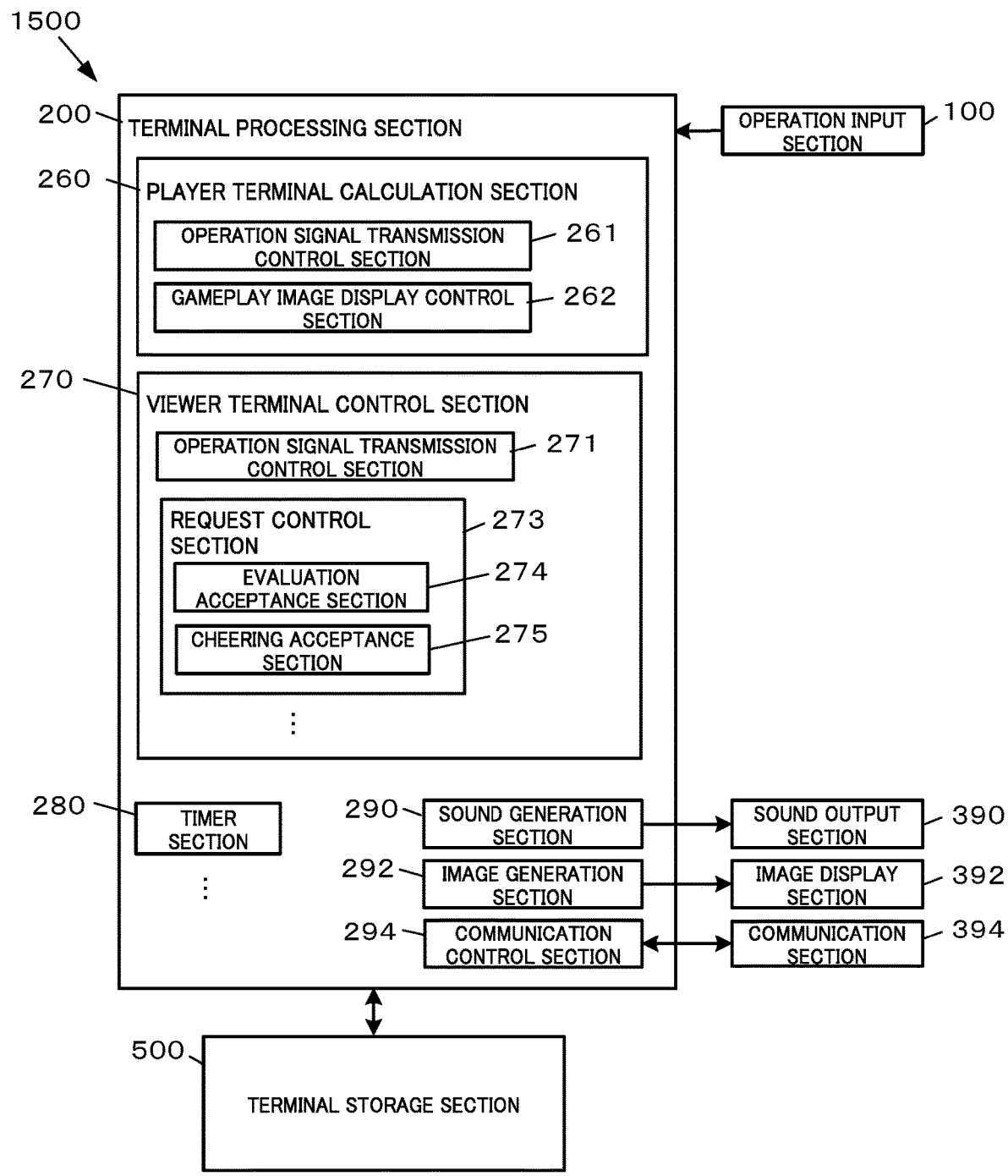
FIG. 29 is a functional block diagram illustrating an example of a functional configuration of a user terminal according to the modification.
Figure 30:
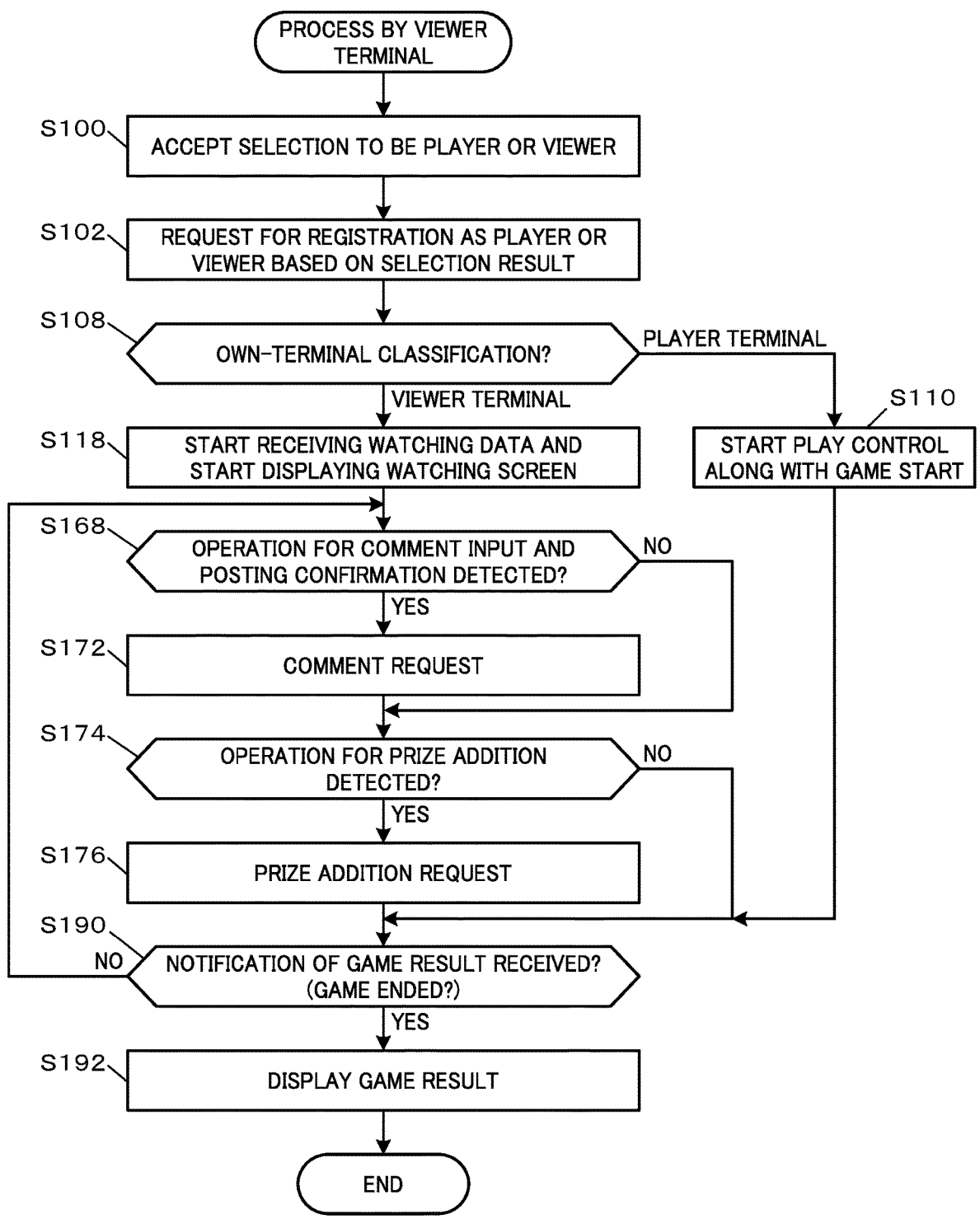
FIG. 30 is a flowchart illustrating a flow of a process in the user terminal according to the modification.

In this case, the user terminal 1500 has a functional configuration, as illustrated in FIG. 29. That is, the gameplay image display control section 272 and the applied screen configuration calling section 278 are omitted. In this case, in a flow of a process of the user terminal 1500, as illustrated in FIG. 30, the steps related to a screen configuration change are omitted.

In the example described with reference to FIGS. 27 to 30, the secondary standard screen configuration and the applied screen configuration calling function by operating the calling icons (the standard screen configuration calling icon 13, the secondary standard screen configuration calling icon

34

14, . . . ) by the user are omitted. However, without omission, the server system 1100 may implement these functions and generate an individual watching screen for each viewer to distribute the watching screen of an individual screen configuration to each viewer terminal.

What is claimed is:

1. A computer system comprising:
a storage device storing a program, and
a processor configured to execute the stored program to:
provide information of a watching screen for a viewer terminal with which a viewer user performs live watching of a game played by a player user, the watching screen including a plurality of panels respectively displaying different contents, one of the content being the game played by the player; and
perform watching screen control of controlling the watching screen to change the watching screen to a first layout of the plurality of panels when a screen configuration change condition is not satisfied, and to change the watching screen to a second layout of the plurality of panels when the screen configuration change condition is satisfied, the screen configuration change condition being a condition triggered based on a number of the viewer users, and positions of the plurality of panels in the first layout are different than the positions of the plurality of panels in the second layout.

2. A computer system comprising:
a storage device storing a program, and
a processor configured to execute the stored program to:
provide information of a watching screen for a viewer terminal with which a viewer user performs live watching of a game played by a player user, the watching screen including a plurality of panels respectively displaying different contents, one of the content being the game played by the player; and
perform watching screen control of controlling the watching screen to change the watching screen to a first layout of the plurality of panels when a screen configuration change condition is not satisfied, and to change the watching screen to a second layout of the plurality of panels when the screen configuration change condition is satisfied, wherein the screen configuration change condition is triggered by a predetermined relationship that is set between the player user and the viewer user, and positions of the plurality of panels in the first layout are different than the positions of the plurality of panels in the second layout.

3. A computer system comprising:
a storage device storing a program, and
a processor configured to execute the stored program to:
provide information of a watching screen for a viewer terminal with which a viewer user performs live watching of a game played by a player user, the watching screen including a plurality of panels respectively displaying different contents, one of the content being the game played by the player;
accept evaluation of a gameplay of the player user by the viewer user; and
perform watching screen control of controlling the watching screen to change the watching screen to a first layout of the plurality of panels when a screen configuration change condition is not satisfied, and to change the watching screen to a second layout of the plurality of panels when the screen configuration change condition is satisfied, wherein the screen configuration change condition is triggered based on the accepted evaluation, and positions of the plurality of panels in the first layout are different than the positions of the plurality of panels in the second layout.

4. The computer system as defined in claim 2, wherein:
the processor executes the program to accept an evaluation of a gameplay of the player user by the viewer user, and
the screen configuration change condition is based on the accepted evaluation.

5. The computer system as defined in claim 3, wherein the watching screen control includes controlling the watching screen to display the accepted evaluation in one of the plurality of panels, when the screen configuration change condition based on the accepted evaluation is satisfied.

6. The computer system as defined in claim 4, wherein the watching screen control includes controlling the watching screen to display the accepted evaluation in one of the plurality of panels, when the screen configuration change condition based on the accepted evaluation is satisfied.

7. The computer system as defined in claim 3, wherein the accepting of the evaluation includes starting to accept the evaluation when a number of viewer users, which includes the viewer user, satisfies a predetermined threshold condition.

8. The computer system as defined in claim 5, wherein the accepting of the evaluation includes starting to accept the evaluation when a number of viewer users, which includes the viewer user, satisfies a predetermined threshold condition.

9. A computer system comprising:
a storage device storing a program, and
a processor configured to execute the stored program to:
provide information of a watching screen for a viewer terminal with which a viewer user performs live watching of a game played by a player user, the watching screen including a plurality of panels respectively displaying different contents, one of the content being the game played by the player;
provide a given reward to the viewer user or the player user when a predetermined reward giving condition is satisfied; and
perform watching screen control of controlling the watching screen to change the watching screen to a first layout of the plurality of panels when a screen configuration change condition is not satisfied, and to change the watching screen to a second layout of the plurality of panels when the screen configuration change condition is satisfied, wherein the screen configuration change condition is that the reward has been given, and positions of the plurality of panels in the first layout are different than the positions of the plurality of panels in the second layout.

10. The computer system as defined in claim 9, wherein the watching screen control includes controlling the watching screen to display the reward in one of the plurality of panels, when the screen configuration change condition is satisfied.

11. The computer system as defined in claim 9, wherein the giving of the reward includes determining whether the reward giving condition is satisfied based on any one of a number of viewer users, which includes the viewer user, a progress status of the game, and whether a predetermined relationship is set between the viewer user and the player user.

12. The computer system as defined in claim 10, wherein the giving of the reward includes determining whether the reward giving condition is satisfied based on any one of a number of viewer users, which includes the viewer user, a progress status of the game, and whether a predetermined relationship is set between the viewer user and the player user.

13. A computer system comprising:
a storage device storing a program, and
a processor configured to execute the stored program to:
provide information of a watching screen for a viewer terminal with which a viewer user performs live watching of a game played by a player user, the watching screen including a plurality of panels respectively displaying different contents, one of the content being the game played by the player;
accept cheering of the player user by the viewer user when a number of the viewer users satisfies a predetermined threshold condition; and
perform watching screen control of controlling the watching screen to change the watching screen to a first layout of the plurality of panels when a screen configuration change condition is not satisfied, and to change the watching screen to a second layout of the plurality of panels when the screen configuration change condition is satisfied, wherein the screen configuration change condition is based on the accepted cheering, and positions of the plurality of panels in the first layout are different than the positions of the plurality of panels in the second layout.

14. The computer system as defined in claim 13, wherein the watching screen control includes controlling the watching screen to display the accepted cheering in one of the plurality of panels, when the screen configuration change condition based on the cheering is satisfied.

15. A viewer terminal comprising a processor configured to:
receive, from a server system, information of a watching screen with which a viewer user performs live watching of a game played by a player user; and
perform watching screen control of a display of controlling the watching screen to change the watching screen to a first layout of a plurality of panels when a screen configuration change condition is not satisfied, and to change the watching screen to a second layout of the plurality of panels when the screen configuration change condition is satisfied, the screen configuration change condition being a condition triggered based on a number of the viewer users, and positions of the plurality of panels in the first layout are different than the positions of the plurality of panels in the second layout.

16. A game system comprising:
the viewer terminal as defined in claim 15; and
a server system.

17. A method for controlling live watching, the method comprising:
with a viewer terminal,
receiving, from a server system, information of a watching screen with which a viewer user performs live watching of a game played by a player user; and
performing watching screen control of a display of controlling the watching screen to change the watching screen to a first layout of a plurality of panels when a screen configuration change condition is not satisfied, and to change the watching screen to a second layout of the plurality of panels when the screen configuration change condition is satisfied, the screen configuration change condition being a condition triggered based on a number of the viewer users, and positions of the plurality of panels in the first layout are different than the positions of the plurality of panels in the second layout.

18. The computer system as defined in claim 1, wherein the watching screen control includes performing control of changing the watching screen to the second layout that differs depending on the number of the viewer users.

19. The computer system as defined in claim 2, wherein the predetermined relationship is any one of a relationship in which users register each other as a friend, a relationship in which an intimacy parameter value as the friend satisfies a predetermined condition, a relationship in which users are registered as members of a same team, a relationship in which users are using a same kind of characters, and a relationship in which users have histories of playing together in the past.

20. A viewer terminal comprising a processor configured to:
receive, from a server system, information of a watching screen with which a viewer user performs live watching of a game played by a player user; and
perform watching screen control of a display of controlling the watching screen to change the watching screen to a first layout of a plurality of panels when a screen configuration change condition is not satisfied and to change the watching screen to a second layout of the plurality of panels when the screen configuration change condition is satisfied, wherein the screen configuration change condition is triggered by a predetermined relationship that is set between the player user and the viewer user, and positions of the plurality of panels in the first layout are different than the positions of the plurality of panels in the second layout.

21. A method for controlling live watching, the method comprising:
receiving, from a server system, information of a watching screen with which a viewer user performs live watching of a game played by a player user; and
performing watching screen control of a display of controlling the watching screen to change the watching screen to a first layout of a plurality of panels when a screen configuration change condition is not satisfied during the live watching and to change the watching screen to a second layout of the plurality of panels when the screen configuration change condition is satisfied, wherein the screen configuration change condition is triggered by a predetermined relationship that is set between the player user and the viewer user, and positions of the plurality of panels in the first layout are different than the positions of the plurality of panels in the second layout.

* * * * *